US007536054B2

(12) United States Patent
Banno et al.

(10) Patent No.: US 7,536,054 B2
(45) Date of Patent: May 19, 2009

(54) IMAGE COMPRESSION DEVICE, IMAGE COMPRESSION METHOD, IMAGE COMPRESSION PROGRAM, COMPRESSION ENCODING METHOD, COMPRESSION ENCODING DEVICE, COMPRESSION ENCODING PROGRAM, DECODING METHOD, DECODING DEVICE, AND DECODING PROGRAM

(75) Inventors: Hajime Banno, Yokohama (JP); Makoto Ikarashi, Yokohama (JP)

(73) Assignee: Ishikawajima-Harima Heavy Industries Co., Ltd. (JP)

( * ) Notice: Subject to any disclaimer, the term of this patent is extended or adjusted under 35 U.S.C. 154(b) by 526 days.

(21) Appl. No.: 10/545,873
(22) PCT Filed: Feb. 17, 2004
(86) PCT No.: PCT/JP2004/001717

§ 371 (c)(1),
(2), (4) Date: Aug. 17, 2005

(87) PCT Pub. No.: WO2004/075556

PCT Pub. Date: Sep. 2, 2004

(65) Prior Publication Data

US 2006/0092271 A1 May 4, 2006

(30) Foreign Application Priority Data

Feb. 19, 2003 (JP) ............................. 2003-041021
Mar. 4, 2003 (JP) ............................. 2003-057330
Jul. 31, 2003 (JP) ............................. 2003-204646

(51) Int. Cl.
*G06K 9/36* (2006.01)

(52) U.S. Cl. ...................................................... 382/232

(58) Field of Classification Search ......... 382/232-233, 382/236, 238-240, 243-248, 250-252; 375/240, 375/240.02, 240.12-240.16, 240.18-240.2, 375/240.24, 240.27; 348/384.1, 394.1-395.1, 348/400.1-404.1, 407.1-416.1, 420.1-421.1, 348/424.2, 425.2, 430.1-431.1
See application file for complete search history.

(56) References Cited

U.S. PATENT DOCUMENTS 4,363,036 A * 12/1982 Subramaniam ............. 382/238

(Continued)

FOREIGN PATENT DOCUMENTS

JP 53-110338 9/1978

(Continued)

OTHER PUBLICATIONS

English translation attached.

(Continued)

*Primary Examiner*—Jose L Couso
(74) *Attorney, Agent, or Firm*—Ostrolenk, Faber, Gerb & Soffen, LLP

(57) ABSTRACT

There are provided an image compression device, method, and program, a compression code data encoding device, method, and program, and a decoding device, method, and program. The image compression device includes: means for dividing the entire image into blocks, calculating an inclined plane or an outer edge inclined plane for calculating a parameter specifying the inclined plane or the outer edge inclined plane for approximating the respective blocks from the block pixel values, calculating an error amount or a difference value to calculate a difference between the inclined plane or the outer edge inclined plane and the respective pixel values, and calculating an encoding correction amount of each block; and encoding portion for reversibly encoding the parameter specifying the inclined plane or the outer edge inclined plane. The encoding device includes synthesis portion for judging a change amount of generation probability contained in the data to be compressed and obtained in time series, generating difference probability data including a generation probability of data having a large generation probability, and synthesizing the generated difference probability data with the compression/encoding data.

36 Claims, 24 Drawing Sheets

U.S. PATENT DOCUMENTS

| | | | | |
|---|---|---|---|---|
| 5,604,494 | A * | 2/1997 | Murakami et al. | 341/50 |
| 5,966,465 | A * | 10/1999 | Keith et al. | 382/232 |
| 6,014,463 | A * | 1/2000 | Hirabayashi | 382/232 |
| 6,061,474 | A * | 5/2000 | Kajiwara et al. | 382/238 |
| 6,101,282 | A * | 8/2000 | Hirabayashi et al. | 382/246 |
| 6,795,578 | B1 * | 9/2004 | Kotani et al. | 382/180 |
| 7,158,680 | B2 * | 1/2007 | Pace | 382/232 |

FOREIGN PATENT DOCUMENTS

| | | |
|---|---|---|
| JP | 60-87596 | 5/1985 |
| JP | 60-096079 | 5/1985 |
| JP | 3-192876 | 8/1991 |
| JP | 05-075477 | 3/1993 |
| JP | 7-274171 | 10/1995 |
| JP | 08-223054 | 8/1996 |
| JP | 08-340555 | 12/1996 |
| JP | 9-200775 | 9/1997 |
| JP | 10-51771 | 2/1998 |
| JP | 10-322222 | 12/1998 |
| JP | 11-112356 | 4/1999 |

OTHER PUBLICATIONS

International Search Report PCT/JP2004/001717 dated May 11, 2004.
Japanese Office Action (abridged English language translation).
Christoph Loeffler, et al., Practical Fast 1-D DCT Algorithms With 11 Multiplications, 1989 IEEE, pp. 988-991.
C. Magazine, Aug. 2001, pp. 111 to 116.
C. Magazine, Sep. 2001, pp. 95-100.
C. Magazine, Jul. 2002, pp. 13-35.

* cited by examiner

| | | | |
|---|---|---|---|
| + | * | * | − |
| + | | | − |
| + | | | − |
| + | * | * | − |

| | | | |
|---|---|---|---|
| + | + | + | + |
| * | | | * |
| * | | | * |
| − | − | − | − |

| | | | |
|---|---|---|---|
| 24 | 36 | 44 | 54 |
| 21 | 15 | 45 | 51 |
| 14 | 15 | 15 | 44 |
| 11 | 10 | 29 | 41 |

| | | | |
|---|---|---|---|
| m+2dX+2dY | m+dX+2dY | m−dX+2dY | m−2dX+2dY |
| m+2dX+dY | m+dX+dY | m−dX+dY | m−2dX+dY |
| m+2dX−dY | m+dX−dY | m−dX−dY | m−2dX−dY |
| m+2dX−2dY | m+dX−2dY | m−dX−2dY | m−2dX−2dY |

CENTER (arrow at left, between rows 2 and 3)

CENTER (arrow at bottom, between columns 2 and 3)

| | | | |
|---|---|---|---|
| 26 | 36 | 46 | 56 |
| 20 | 30 | 40 | 50 |
| 14 | 24 | 34 | 44 |
| 8 | 18 | 28 | 38 |

FIG. 11

| | | | |
|---|---|---|---|
| −2 | 0 | −2 | −2 |
| 1 | −15 | 5 | 1 |
| 0 | −9 | −19 | 0 |
| 3 | −8 | 1 | 3 |

FIG. 12

| | | | |
|---|---|---|---|
| | | | |
| | 15 | | |
| | 15 | 15 | |
| | 10 | | |

FIG. 13

| | | | |
|---|---|---|---|
| 19 | 20 | 21 | 22 |
| 16 | 17 | 18 | 19 |
| 13 | 14 | 15 | 16 |
| 10 | 11 | 12 | 13 |

FIG. 14

| | | | |
|---|---|---|---|
| 0 | 0 | 0 | 0 |
| 0 | 1 | 0 | 0 |
| 0 | 1 | 1 | 0 |
| 1 | 1 | 0 | 0 |

FIG. 15

| | | | |
|---|---|---|---|
| 26 | 36 | 46 | 56 |
| 20 | 17 | 40 | 50 |
| 14 | 14 | 15 | 44 |
| 10 | 11 | 28 | 38 |

FIG. 23
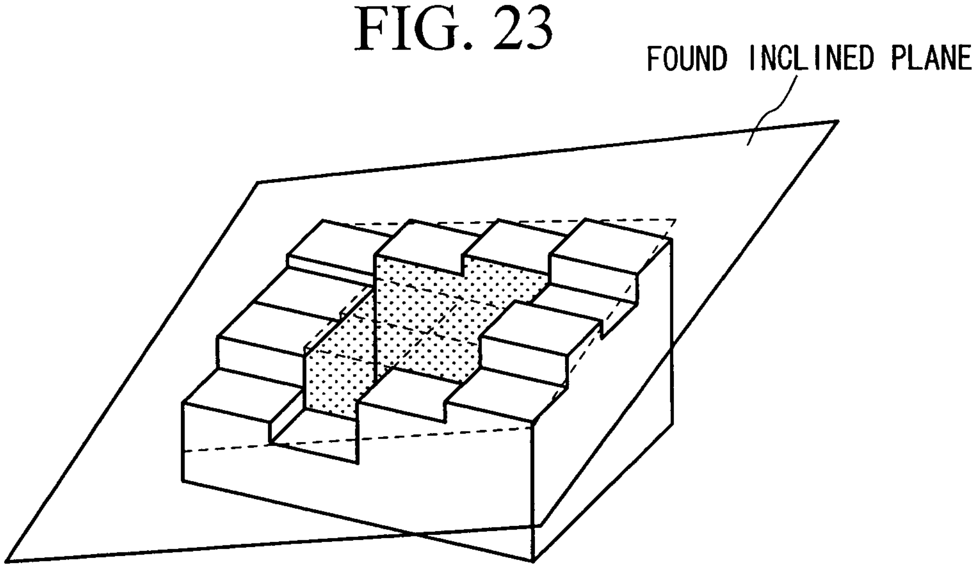
FIG. 24A
| | | | |
|---|---|---|---|
| + | * | * | − |
| + | | | − |
| + | | | − |
| + | * | * | − |
FIG. 24B
| | | | |
|---|---|---|---|
| + | + | + | + |
| * | | | * |
| * | | | * |
| − | − | − | − |
FIG. 25
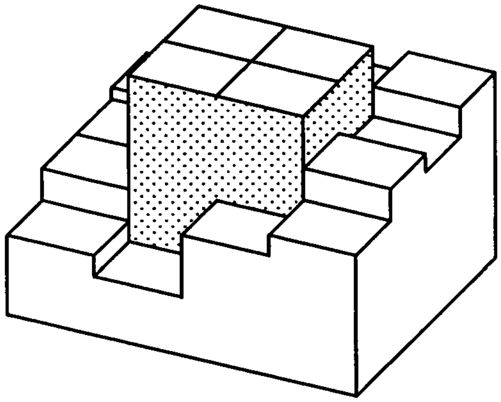

| | | | |
|---|---|---|---|
| 24 | 40 | 44 | 54 |
| 19 | 39 | 40 | 49 |
| 16 | 40 | 42 | 46 |
| 9 | 21 | 27 | 39 |

| | | | | |
|---|---|---|---|---|
| | m+2dX+2dY | m+dX+2dY | m−dX+2dY | m−2dX+2dY |
| CENTER → | m+2dX+dY | m+dX+dY | m−dX+dY | m−2dX+dY |
| | m+2dX−dY | m+dX−dY | m−dX−dY | m−2dX−dY |
| | m+2dX−2dY | m+dX−2dY | m−dX−2dY | m−2dX−2dY |

CENTER ↑

| | | | |
|---|---|---|---|
| 25 | 32 | 48 | 55 |
| 21 | 29 | 44 | 51 |
| 13 | 21 | 36 | 43 |
| 11 | 18 | 34 | 41 |

FIG. 30

| | | | |
|---|---|---|---|
| −1 | 8 | −4 | −1 |
| −2 | 10 | −14 | −2 |
| 3 | 14 | 6 | 3 |
| −2 | 3 | −7 | −2 |

FIG. 31

| | | | |
|---|---|---|---|
| 1 | 0 | 1 | 1 |
| 1 | 0 | 1 | 1 |
| 0 | 0 | 0 | 0 |
| 1 | 0 | 1 | 1 |

FIG. 32

| | | | |
|---|---|---|---|
| −5 | +5 | −5 | −5 |
| −5 | +5 | −5 | −5 |
| +5 | +5 | +5 | +5 |
| −5 | +5 | −5 | −5 |

FIG. 33

| | | | |
|---|---|---|---|
| 20 | 37 | 43 | 50 |
| 16 | 34 | 39 | 46 |
| 18 | 26 | 41 | 48 |
| 6 | 13 | 29 | 36 |

FIG. 38

| P | | $T_{max}$ (WHEN $\alpha$ > 1) | $T_{min}$ (WHEN $\alpha$ < 1) |
|---|---|---|---|
| 0.25 | (1/4) | 1.080 | 0.924 |
| 0.125 | (1/8) | 1.123 | 0.885 |
| 0.0625 | (1/16) | 1.184 | 0.835 |
| 0.03125 | (1/32) | 1.271 | 0.770 |
| 0.01563 | (1/64) | 1.400 | 0.684 |
| 0.00781 | (1/128) | 1.595 | 0.575 |
| 0.00391 | (1/256) | 1.898 | 0.442 |
| 0.00195 | (1/512) | 2.385 | 0.294 |
| 0.00098 | (1/1024) | 3.195 | 0.152 |

FIG. 39A

| P | | α (WHEN > 1) | | | |
|---|---|---|---|---|---|
| | | 1.2 | $\sqrt{2}$ | 2 | $2\sqrt{2}$ |
| 0.25 | (1/4) | 787 | 196 | 37 | 11 |
| 0.125 | (1/8) | 1885 | 483 | 101 | 36 |
| 0.0625 | (1/16) | 4081 | 1057 | 227 | 85 |
| 0.03125 | (1/32) | 8472 | 2204 | 480 | 184 |
| 0.01563 | (1/64) | 17255 | 4500 | 986 | 381 |
| 0.00781 | (1/128) | 34820 | 9091 | 1998 | 774 |
| 0.00391 | (1/256) | 69951 | 18273 | 4022 | 1562 |
| 0.00195 | (1/512) | 140213 | 36636 | 8070 | 3137 |
| 0.00098 | (1/1024) | 280737 | 73364 | 16166 | 6287 |

FIG. 39B

| P | | α (WHEN < 1) | | | |
|---|---|---|---|---|---|
| | | 0.8 | $1/\sqrt{2}$ | 1/2 | $1/2\sqrt{2}$ |
| 0.25 | (1/4) | 657 | 289 | 84 | 43 |
| 0.125 | (1/8) | 1496 | 651 | 185 | 92 |
| 0.0625 | (1/16) | 3173 | 1374 | 386 | 191 |
| 0.03125 | (1/32) | 6528 | 2820 | 788 | 388 |
| 0.01563 | (1/64) | 13236 | 5713 | 1591 | 783 |
| 0.00781 | (1/128) | 26654 | 11497 | 3199 | 1573 |
| 0.00391 | (1/256) | 53489 | 23067 | 6415 | 3152 |
| 0.00195 | (1/512) | 107159 | 46206 | 12846 | 6310 |
| 0.00098 | (1/1024) | 214500 | 92484 | 25708 | 12627 |

IMAGE COMPRESSION DEVICE, IMAGE COMPRESSION METHOD, IMAGE COMPRESSION PROGRAM, COMPRESSION ENCODING METHOD, COMPRESSION ENCODING DEVICE, COMPRESSION ENCODING PROGRAM, DECODING METHOD, DECODING DEVICE, AND DECODING PROGRAM

CROSS REFERENCE TO RELATED APPLICATION

The present application is a 35 U.S.C. § 371 national phase conversion of PCT/JP2004/001717 filed 17 Feb. 2004, which claims priority of Japanese Application No. 2003-041021 filed Feb. 19, 2003, Japanese Application No. 2003-057330 filed Mar. 4, 2003, and Japanese Application No. 2003-204646 filed Jul. 31, 2003,

TECHNICAL FIELD

A first aspect of the present invention relates to an image compression device, an image compression method, and an image compression program that perform image compression with excellent reproducibility, a second aspect relates to an image compression device, an image compression method, and an image compression program that perform image compression with excellent reproducibility in a short period of time, and a third aspect of the present invention relates to a compression encoding method, device and program therefor, which reduce data quantity by encoding and compressing continuous data, and to a decoding method, device, and program therefor, for performing decoding of the compression encoded data that has been compression encoded by the encoding device or the like.

BACKGROUND ART

The background art and the object of the first aspect of the present invention are as follows.

Since the data quantity of an image data is large, when an image data is accumulated without performing compression, performance is reduced in all aspects of data usage speed and data accumulation efficiency. As a result, when accumulating and using image data, it is desirable to carry out highly efficient compression. As one of examples to carry out compression, JPEG (Joint Photographic Expert Group/ISO IEC 10918-1) is known as a method for performing image compression. In image compression by JPEG, the compression process is performed in the procedure shown below.

(1) An image is divided into 8×8 pixels blocks.

(2) For encoding, a pixel block is transformed into frequency components Qij having 8 factors in each of the x and y directions totaling 64 factors, and into a direct current component DC, using a DCT transform (Discrete Cosine Transform).

(3) In quantization, Qij, which is primarily a real number, is converted into an integer data by normalization in line with a constant rule such that Qij is multiplied by a constant number (obtained so that the result of the multiplication falls in the range between −128 and 127), and is rounded off so that its absolute value becomes small. Furthermore, Qij is picked up in zigzags to make a data train (however, when 0 is found, the subsequent data is regarded as 0).

(4) For the DC components of the Qij series, Huffman Coding, which is one type of entropy coding, is performed to produce compression data.

(5) Compression data and parameters are multiplexed in a predetermined order.

Also, in addition to the above-described method, BTC (Block Truncation Coding) method disclosed in a patent document 1 (Japanese Patent Application, First Publication No. Sho 60-087596) is known as a method for encoding blocks. This method is an encoding method that expresses blocks by 3 parameters; that is, pattern information that indicates whether each pixel color in an encoding object block is not less than the block average value; a block average value; and a value indicating the size of the gradation scale, which changes according to the pattern (for example, a variance of pixel values in the block).

However, it is commonly known that distortions (DCT noise peculiar to frequency component synthesis) occur along the edge of the blocks in the case where the data of the blocks is encoded with Discrete Cosine Transform like JPEG. On the other hand, BTC is an encoding method that reproduces the edge true to the original and can perform processing faster than the Discrete Cosine Transform can. However, because the compression ratio drops drastically when the number of used colors is increased, the number of colors is restricted when performing highly efficient compression, and the gradation comes to resemble a terraced shape, and color borders become prominent. Furthermore, since all pixels in the block are treated equally in compression by both Discrete Cosine Transform and BTC, when there is a coloration that is occurring a lot around the center, subtle colorations on the outer edge part also become similar to the color of the center, and a color difference on the border between blocks becomes prominent.

In order to solve the problem of the occurrence of distortions such as this, a number of improvement methods for these methods have been proposed. For example, a method disclosed in Patent Document 2 for improving image quality using combination of Discrete Cosine Transform and BTC has been proposed. This method performs processing in following order.

(1) An image is divided into blocks.

(2) Edge extraction is performed for each block.

(3) BTC encoding and BTC decoding are performed for the edge part, and the image in which the edge is negated is prepared.

(4) A Discrete Cosine Transform is performed for the image in which edges are removed.

When this method is used, it becomes possible to perform encoding without errors even for the gradations occurring in a block and for edges.

Patent Document 1: Japanese Unexamined Patent Application, First Publication No. Sho 60-087596

Patent Document 2: Japanese Unexamined Patent Application, First Publication No. Hei 3-192876

However, in the case that a man recognizes an image, the image must includes features, such as "boundary edge of color", "a combination of background and lines", and "gradation" which are characteristics for recognizing an image content. Thus, when these features are not realized in a reliable manner, a problem arises that a man is likely to misunderstand the image or the man feels that the image quality has been degraded.

As a precondition of the replacement of conventionally used compression algorithm such as JPEG, the quantity of calculations needs to be substantially the same calculation quantity as that of JPEG encoding (when this quantity increases, there will be a problem of a reduction in the number of images that can be transmitted via communication lines). However, in Japanese Unexamined Patent Publication No.

H03-192876, processes such as edge extraction of the block and DCT that require a large quantity of calculations are performed and a plurality of processes have to be performed. Therefore there is a problem in that it is difficult to perform compression having excellent reproducibility in terms of the above three characteristics, which are important for an image compression that is used for accumulating or transmitting and reproducing an image while satisfying the precondition of having substantially the same quantity of calculations as that of JPEG.

An object of the first aspect of the present invention, in consideration of the above circumstances, is to provide an image compression device, an image compression method, and an image compression program that can perform a compression process without lengthening calculation process time and that can improve image quality.

The background art and the object of the second aspect of the present application are as follows.

Since the data quantity of an image data is large, when accumulated without performing compression, performance is reduced in all aspects of data usage speed and data accumulation efficiency. As a result, when accumulating and using image data, it is desirable that highly efficient compression is performed. JPEG (Joint Photographic Expert Group/ISO lEC 10918-1) is known as a method for performing image data compression. In image data compression by JPEG, the compression process is performed in the procedure shown below. (1) An image is divided into 8×8 pixels blocks. (2) For encoding, each block is transformed into frequency components Qij having 8 factors in each of the x and y directions totaling 64 factors; and into a direct current component DC, using a DCT transform (Discrete Cosine Transform). (3) In quantization, Qij, which is primarily a real number, is converted into an integral number by normalization based on a constant law such as: Qij is multiplied by a constant number (found so that the result of the multiplication falls in the range between −128 and 127), and is rounded off so that its absolute value becomes small. Furthermore, Qij is picked up in zigzags to make it into a data train (however, when 0 is found, the subsequent data is regarded as 0). (4) For the DC component of the Qij series, Huffman Coding, which is one type of entropy coding, is performed to produce compression data. (5) Compression data and parameters are multiplexed in a predetermined order.

Also, other than this method, the BTC (Block Truncation Coding) method disclosed in the aforementioned Patent Document 1 is known as a method for encoding blocks. This method is an encoding method that expresses blocks by 3 types of parameters namely: pattern information that indicates whether or not each pixel color within the encoding target block is not less than the block average value; a block average value; and a value indicating the size of the gradation scale, which changes according to the pattern (for example, a dispersion value of pixel values in the block).

However, it is commonly known that distortions (DCT noise peculiar to frequency component synthesis) occur along the edge of the blocks in the case where the data of the blocks is encoded with Discrete Cosine Transform like JPEG. On the other hand, BTC is an encoding method that reproduces the edge true to the original and can perform processing faster than the Discrete Cosine Transform can. However, because the compression ratio drops drastically when the number of used colors is increased, the number of colors is restricted when performing highly efficient compression, and the gradation comes to resemble a terraced shape, and color borders become prominent. Furthermore, since all pixels in the block are treated equally in compression by both Discrete Cosine Transform and BTC, when there is a coloration that is occurring a lot around the center, subtle colorations on the outer edge part also become similar to the color of the center, and a color difference on the border between blocks becomes prominent.

In order to solve the problem of the occurrence of distortions, a number of improvement methods for these methods have been proposed. For example, a method disclosed in the aforementioned Patent Document 2 for improving image quality using combination of Discrete Cosine Transform and BTC has been proposed. This method performs processing in following order. (1) An image is divided into blocks. (2) Edge extraction is performed for each block. (3) BTC encoding and BTC decoding are performed for the removing the edge part, and the image having no edge is prepared. (4) A Discrete Cosine Transform is performed for the image after removing edge parts.

When this method is used, it becomes possible to perform encoding without errors even for the gradations occurring in a block and for edges.

However, in the method disclosed in Patent Document 2, there is a problem in that it is difficult to reduce noise on the border of blocks (a particular DCT noise when the frequency components are synthesized), and in addition, the processes such as edge extraction inside a block and DCT that involve a large quantity of calculation, and processing time become extremely long as a plurality of processes have to be performed.

A second aspect of the present invention takes into consideration the above circumstances, with an object of providing an image compression device, an image compression method and an image compression program that can perform a compression process in a short period of calculation processing time and can improve image quality.

The background art and the object of the third aspect of the present invention are as follows.

In a plant such as a factory, in order to monitor the operating status of equipment, a monitoring apparatus which monitors the temperature of the equipment, noise generated from the equipment, or an image of the appearance of the equipment, is used. Since this monitoring apparatus is continuously carrying out monitoring, the monitoring apparatus outputs, consecutively or intermittently consecutively over time, various kinds of monitoring data such as a temperature obtained by measuring the temperature, spectral data obtained by measuring the noise, and image data captured by a monitoring camera.

Since the quantity of these monitoring data become large, there is a problem in that, for example, a high capacity recording device is required when accumulating and managing monitoring data, and transmission of monitoring data requires a long period of time when transmitting monitoring data for data analysis to a monitoring room provided in a remote place. In order to solve such a problem, the monitoring data is compressed by encoding, and a reduction in data recording quantity and data transmission quantity can be achieved.

Various kinds of method for compressing data by encoding have been proposed. However, the measuring time of the monitoring data output from the above monitoring apparatus is not predetermined, the monitoring data is data output continuously or intermittently over 24 hours, and has a correlation in time series and its content does not significantly change. As a result, a method is needed for sequentially compressing the continuously obtained monitoring data by encoding. Data that has such characteristics is often compressed using entropy coding.

Furthermore, in the case where a motion image is processed, a principally used method is one of combining block encoding, which reduces data quantity by extracting values that indicate image characteristics for each block of a grouped number of images, as a preprocess of entropy coding.

As is commonly known, data compression by entropy coding performs a compression in which an occurrence probability of each data that is included in the data to be compressed (hereinafter, referred to as compression target data) is used, and a code of a small bit number is assigned to the data of high occurrence probability, and a code of a large bit number is assigned to the data of low occurrence probability. Here, where the occurrence probability of data x included in the compression target data is $P_x$, $P_x$ is found by (number of data x/total number of compression target data), and the most efficient compression can be performed when a code having a bit number of $\log_2(1/P_x)$ is assigned to the data x, when performing compression.

As a specific encoding method that uses the above entropy coding, arithmetic signing, Huffman Coding and Range Coder, which is a modified arithmetic coding are commonly known. The detail of the arithmetic coding is shown in Patent Document 3. Furthermore, see following three non-patent documents 1 to 3 for specific examples of each of the above encoding methods.

A table indicating an occurrence probability distribution that indicates the probability of occurrence for each datum to be used in entropy coding (hereinafter, referred to as a "occurrence probability table") is required not only in the data encoding but also in the decoding of compressed data (hereinafter referred to as compression encoded data). Moreover, the same occurrence probability table used in encoding must be used when decoding, otherwise the compression encoded data cannot be correctly decoded. In order to have the same occurrence probability table on the encoding side and the decoding side, the following method is used for example.

[First Method]

The occurrence probability data used in encoding on the encoding side is included in the compression encoded data to be recorded or transmitted, and the decoding side uses the occurrence probability data that has been included in the compression encoded data and has been recorded or transmitted, to decode the compression encoded data.

[Second Method]

The predetermined occurrence probability table is prepared on both the encoding side and the decoding side, and the encoding side performs encoding using the pre-prepared occurrence probability table and records or transmits only the compression encoded data, and the decoding side decodes the recorded or transmitted compression encoded data using the pre-prepared occurrence probability table.

Furthermore, when performing compression encoding, unless the compression target data is compressed using the occurrence probability table that matches the occurrence probability distribution of each datum included in the compression target data, the compression ratio decreases, and the total data quantity of the compression encoded data may become greater than the total data quantity of the compression target data in some cases. As a method for preventing such a problem, the following third method has been proposed.

[Third Method]

A plurality of types of occurrence probability data are pre-prepared on both the encoding side and the decoding side, and the encoding side performs encoding using a occurrence probability table that is close to the occurrence probability distribution of the compression target data, and the information that indicates the occurrence probability data used in encoding is included in the compression encoded data and is recorded or transmitted, and the decoding side decodes the compression encoded data using the occurrence probability data indicated by the recorded or transmitted information that has been included in the compression encoded data. Refer for example to the following Patent Document 4 for details of this method.

Patent Document 3: Japanese Unexamined Patent Application, First Publication No. Sho 53-110338

Patent Document 4: Japanese Unexamined Patent Application, First Publication No. Hei 07-274171

Non-Patent Document 1: "C MAGAZINE", August 2001, p. 111 to 116

Non-Patent Document 2: "C MAGAZINE", September 2001, p. 95 to 100

Non-Patent Document 3: "C MAGAZINE", July 2002, p. 16 to 35

Incidentally, in the case where the above first method is used, there has been a problem in that since all occurrence probability tables have to be included in the compression encoded data, the total data quantity to be recorded or transmitted is not significantly reduced despite a reduction in the data quantity of the compression target data, and the total data quantity to be recorded or transmitted may become greater than the data quantity of the compression target data in some cases.

Moreover, in the case where the above second method is used, the occurrence probability table does not need to be included in the compression encoded data. However there has been a problem in that the compression ratio decreases unless the occurrence probability distribution of the compression target data matches the occurrence probability table used, and the total data quantity of the compression encoded data may become greater than the total data quantity of the compression target data in some cases.

In particular, in the case where motion images are processed, although there is a relationship of data occurrence probability between the consecutive images, the above first method (for example, used in JPEG), or the above second method (for example, used in MPEG) is used.

Furthermore, in the case where the above third method is used, the occurrence probability table may only be selected from a prepared plurality of occurrence probability tables as one that is close to the occurrence probability distribution of the compression target data, and there has been a problem in that the compression ratio decreases and the total data quantity of the compression encoded data may become greater than the total data quantity of the compression target data in some cases, as is the case with the second method.

The present invention according to the third aspect has been achieved in consideration of above circumstances, and its object is to provide a method, a device, and a program for compression encoding that can achieve a reduction in the total data quantity when transmitting a consecutive plurality of compressed data, even in the case where the occurrence probability table is included in the compression encoded data, and to provide a method, a device, and a program for decoding the compression encoded data that has been encoded by the aforementioned device or the like.

DISCLOSURE OF THE INVENTION

An image compression device, an image compression method, and an image compression program, serving as a device for solving the object of the first aspect of the present invention, are as follows.

The first aspect provides an image compression apparatus comprising: a block division portion that divides an entire image into blocks of n×m pixels (where n and m are real numbers equal to or greater than 4); a first inclined plane calculation portion that finds parameters that specify a first inclined plane that approximates the block, from the block pixel values; an error amount calculation portion that calculates n×m pieces of error amounts by calculating the difference between the first inclined plane and each pixel value in the block; a second inclined plane calculation portion that in the case where a pixel having the error amount above a predetermined threshold value is present, finds parameters that specify a second inclined plane only from the pixel values having the error amount above the predetermined threshold value; and an encoding portion that performs reversible encoding for the parameters that specify the first and second inclined planes.

In the image compression apparatus in the above first aspect, the above first inclined plane calculation portion obtains the parameters which specify the inclined plane from only the pixel value of an outer edge part of the block.

An image compression method in the above first aspect that irreversibly compresses image data, said method comprising: a division step for dividing an entire image into blocks of n×m pixels (where n and m are real numbers equal to or greater than 4); a first inclined plane calculation step for finding parameters that specify a first inclined plane that approximates the block, from the block pixel values; an error amount calculation step for calculating n×m pieces of error amounts by calculating the difference between the first inclined plane and each pixel value in the block; a second inclined plane calculation step for, in the case where a pixel having the error amount above a predetermined threshold value is present, finding parameters that specify a second inclined plane only from the pixel values having the error amount above the predetermined threshold value; and an encoding step for performing reversible encoding for the parameters that specify the first and second inclined planes.

In the image compression method in the first aspect is characterized in that the above first inclined plane calculation step finds the parameters which specify the inclined plane from only the pixel value of an outer edge part of the block.

An image compression program for irreversibly compressing image data, said program to be executed on a computer, comprising: a block division process for dividing an entire image into blocks of n×m pixels (where n and m are real numbers equal to or greater than 4); a first inclined plane calculation process for finding parameters that specify a first inclined plane that approximates the block, from the block pixel values; an error amount calculation process for calculating n×m pieces of error amounts by calculating the difference between the first inclined plane and each pixel value in the block; a second inclined plane calculation process for, in the case where a pixel having the error amount above a predetermined threshold value is present, finding parameters that specify a second inclined plane only from the pixel values having the error amount above the predetermined threshold value; and an encoding process for performing reversible encoding for the parameters that specify the first and second inclined planes.

In the image compression program in the first aspect, the above first inclined plane calculation process obtains the parameters which specify the inclined plane from only the pixel value of an outer edge part of the block.

The second aspect of the present invention provides an image compression device, an image compression method, and an image compression program are as follows.

The image compression device in the second aspect comprising: a block division portion that divides an entire image into blocks of n×m pixels (where n and m are real numbers equal to or greater than 4); an outer edge incline calculation portion that finds the parameters that specify an inclined plane that approximates an outer edge part of the block from the pixel values of only the outer edge part; a correction value calculation portion that calculates n×m correction values by calculating the difference between the inclined plane and each pixel value in the block; and an encoding portion that performs irreversible encoding for the correction value, and performs reversible encoding for the encoded correction values and for the parameters that specify the inclined plane.

In the image compression device in the second aspect, the encoding portion includes: an encoding calculation portion that expresses the polarity of each of the n×m correction values with 1 bit; and a statistical calculation portion that finds a value which indicates a variance scale of the correction values of a block by statistically processing the correction values in the block.

An image compression method that irreversibly compresses image data in the second aspect comprises: a block division step for dividing an entire image into blocks of n×m pixels (where n and m are real numbers equal to or greater than 4); an outer edge inclined plane calculation step for finding parameters that specify an inclined plane that approximates an outer edge part of the block from the pixel values of only the outer edge part; a correction value calculation step for calculating n×m correction values by calculating the difference between the inclined plane and each pixel value in the block; and an encoding step for performing irreversible encoding for the correction value, and performing reversible encoding for the encoded correction values and for the parameters that specify the inclined plane.

In the image compression method in the second aspect, the above encoding step, expresses the polarity of each of the n×m correction values in 1 bit, and statistically processes the absolute value of each correction value, and performs irreversible encoding by finding a statistical index that indicates the correction scale and making this an amplitude value of all correction values.

The image compression program according to the second aspect is an image compression program for irreversibly compressing image data which is executed on a computer comprising: a block division process for dividing an entire image into blocks of n×m pixels (where n and m are real numbers equal to or greater than 4); an outer edge inclined plane calculation process for finding parameters that specify an inclined plane that approximates an outer edge part of the block from the pixel values of only the outer edge part; a correction value calculation process for calculating n×m correction values by calculating the difference between the inclined plane and each pixel value in the block; and an encoding process for performing irreversible encoding for the correction value, and performing reversible encoding for the encoded correction values and for the parameters that specify the inclined plane.

In the image compression program in the second aspect, the above encoding process expresses the polarity of each of the n×m correction values in 1 bit, and statistically processes the absolute value of each correction value, and performs irreversible encoding by finding a statistical index that indicates the correction scale and making the statistical index an amplitude value of all correction values.

A device, a method and a program for encoding the image compression data found over time, and a device, a method and a program for decoding, serving as means for solving the object of the third aspect of the present invention, are as follows.

A compression encoding method according to the third aspect, in a compression encoding method that generates compression encoded data (D2) compressed by encoding compression target data (D1) correlated in a time series, comprises: a determination step (S312) that determines a size of the variance quantity of the occurrence probability of each of the data included in the compression target data obtained over time; a difference probability data generating step (S314) that generates difference probability data (D3) including the occurrence probability of the data which has been determined to have a large variance quantity of the occurrence probability; and a synthesizing step (S317) that includes the difference probability data in the compression encoded data.

According to the encoding compression method according to the third aspect, the determination step in the encoding method determines whether the generation probability is large or small, a difference probability data is generated for data having a large variance in the generation probability, so that the total data quantity of the final compression encoded data can be reduced because only the difference probability data is included in the compression encoded data. In particular, the occurrence probabilities to be included in the difference probability data become extremely few when correlation in a time series of the compression target data is high, a great reduction in the total data quantity of the compression encoded data can be achieved.

In the compression coding method in the third aspect, the determination step assumes that the change in the occurrence probability of the data is small, and carries out the determination using a threshold value which is set so that a reduction in data quantity of the compression encoded data due to the occurrence probability of the data not being included as the difference probability data in the compression encoded data, is greater than an increase in data quantity of the compression encoded data due to the error occurring when encoding the compression target data using the occurrence probability prior to variation.

In the compression encoding method in the third aspect, the threshold value is set as a variance quantity allowance table that defines an upper limit value and a lower limit value of an allowable occurrence probability variance quantity with respect to each of the data, and the above determination step determines the occurrence probability variance quantity to be large, in the case where the occurrence probability variance quantity of the data is large and above an upper limit value defined in the variance quantity allowance table, or small and below a lower limit value.

In the compression encoding method according to the third aspect, the threshold value is set in a number of data condition table which defines the number of data condition indicating the maximum number of the data for each occurrence probability of the data and each variance quantity of the occurrence probability, and the determination step determines the variance quantity of the occurrence probability to be large in the case where the number of data included in the compression target data is large and above the number of data condition which is defined in the number of data condition table.

In the compression encoding method in the third aspect, the threshold value is set at the reduced data quantity, and the determination step determines the variance quantity of the occurrence probability to be large in the case where the increased data quantity, which is found from the number of data, the occurrence probability, and the variance quantity of the occurrence probability of the data, is large and above the reduced data quantity.

In the compression encoding method in the third aspect, the difference probability data generating step includes in the difference probability data, information indicating that the occurrence probability is equal to the previous occurrence probability, for the data whose variance quantity of the occurrence probability is determined be small.

A compression encoding device in the third aspect, including an encoding portion (315) that generates compression encoded data (D2) compressed by encoding compression target data (D1) correlated in a time series, comprising: a variance quantity determining portion (311) that determines a size of the variance quantity of the occurrence probability of each of the data included in the compression target data obtained over time; a difference probability data generating portion (312) that generates difference probability data (D3) including the occurrence probability of the data which has been determined to have a large variance quantity of the occurrence probability; and a synthesizing portion (316) that includes the difference probability data generated in the difference probability data generating portion in the compression encoded data generated in the encoding portion.

A compression encoding program in the third aspect that generates compression encoded data (D2) compressed by encoding compression target data (D1) correlated in a time series, comprising: a determination step (S312) that determines a size of the variance quantity of the occurrence probability of each of the data included in the compression target data obtained over time; a difference probability data generating step (S314) that generates difference probability data (D3) including the occurrence probability of the data which has been determined to have a large variance quantity of the occurrence probability; and a synthesizing step (S317) that includes the difference probability data in the compression encoded data.

The decoding method in the third aspect comprises: a division and extraction step (S321, S322) that divides and extracts difference probability data (D3) included in compression encoded data (D4) generated by the above compression encoding method, compression encoding device, or compression encoding program; an updating step (S323) that updates an occurrence probability table that indicates occurrence probability of each data included in the compression target data, using the extracted difference probability data; and a decoding step (S324) that performs decoding of the compression encoded data, using the updated occurrence probability table.

In the decoding method in the third aspect of the present invention, since the difference probability data that is included in the compressed compression encoded data is divided and extracted to update the difference probability table, and the divided compression encoded data is decoded using the updated difference probability table, decoding is performed using the same occurrence probability table that was used in the compression encoding, and a correct decoding result can be obtained.

The decoding device according to the third aspect comprises: an extraction portion (321) that divides and extracts difference probability data (D3) included in compression encoded data (D4) generated by the aforementioned compression encoding method, compression encoding device, or compression encoding program; a memory portion (323) that stores an occurrence probability table that indicates occurrence probability of each data included in the compression target data; an updating portion (322) that updates the occurrence probability table stored in the memory portion, using the difference probability data extracted by the extraction portion; and a decoding portion (324) that performs decoding of the divided compression encoded data, using the updated occurrence probability table.

A decoding program in the third aspect of the invention comprises: a division and extraction step (S321, S322) that divides and extracts difference probability data (D3) included in compression encoded data (D4) generated by the aforementioned compression encoding method, compression encoding device, or compression encoding program; an updating step (S323) that updates an occurrence probability table that indicates occurrence probability of each data included in the compression target data, using the extracted difference probability data; and a decoding step (S324) that performs decoding of the compression encoded data, using the updated occurrence probability table.

BRIEF DESCRIPTION OF THE DRAWINGS

FIG. 11 is an explanatory diagram showing an error amount.

FIG. 12 is an explanatory diagram showing target pixel values for calculating a second inclined plane.

FIG. 13 is an explanatory diagram showing respective pixel values of the second inclined plane.

FIG. 14 is an explanatory diagram showing one example of an associated inclined plane map.

FIG. 15 is an explanatory diagram showing pixel values of a reconstructed image.

FIG. 23 is an explanatory diagram showing an inclined plane to be found.

FIGS. 24A and 24B are explanatory diagrams showing a gradient calculation method.

FIG. 25 is an explanatory diagram showing a state where pixel values construct a convex surface.

FIG. 30 is an explanatory diagram showing correction values.

FIG. 31 is an explanatory diagram showing one example of a correction map.

FIG. 32 is an explanatory diagram showing one example of addition and subtraction values.

FIG. 33 is an explanatory diagram showing pixel values of a reconstructed image.

FIG. 38 is a diagram showing one example of a variance quantity allowance table used in a variance quantity determining portion 11.

FIGS. 39A and 39B are diagrams showing one example of a condition table of a number of data used in the variance quantity determining portion 11.

BEST MODE FOR CARRYING OUT THE INVENTION

Hereinafter, best modes for carrying out an image compression device, an image compression method, and an image compression program, and a device, a method, and a program for compression encoding, and a device, a method, and a program for compression decoding of the present invention are described, with reference to drawings. However, the present invention is not limited to each of following aspects, and the components of these aspects may be appropriately combined.

Figure 1:
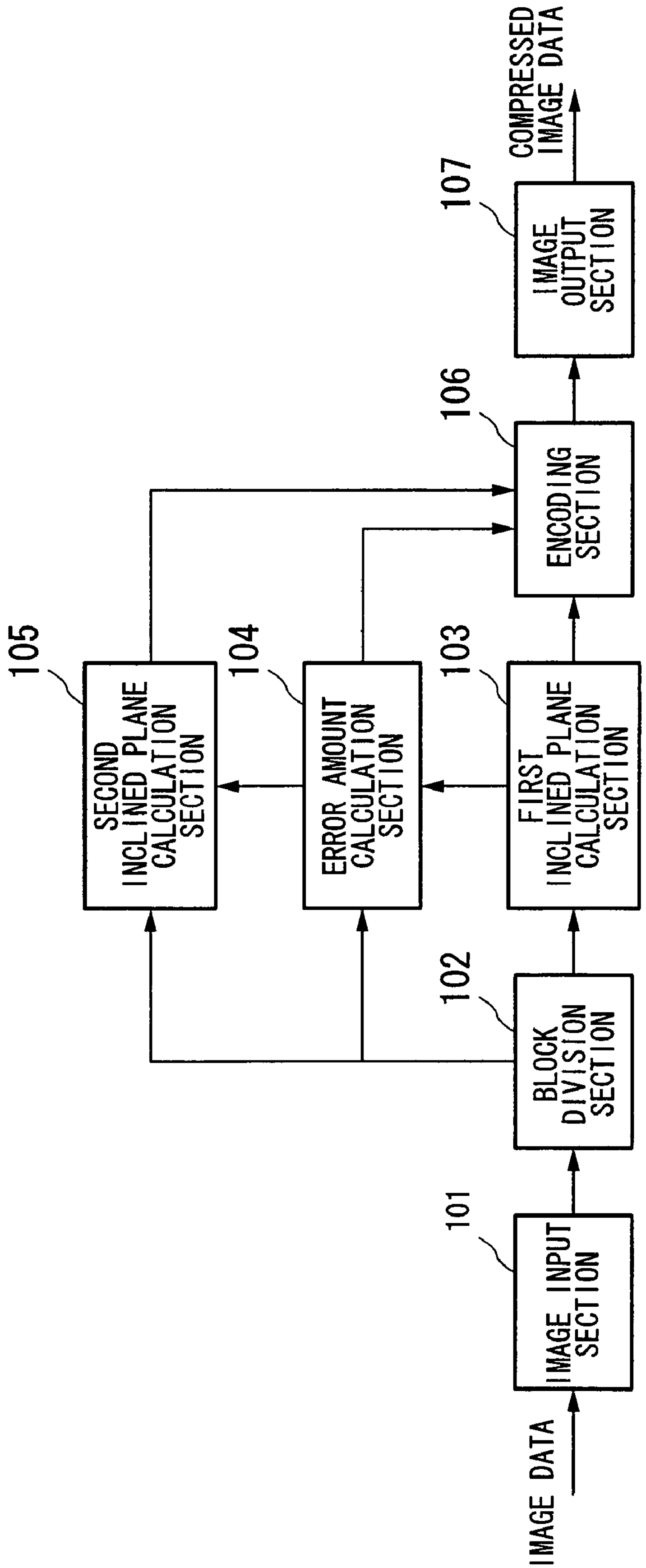
FIG. 1 is a block diagram showing a configuration of a first aspect of the present invention.

Hereinafter, an image compression device according to the first aspect of the present invention is described, with reference to the drawings. FIG. 1 is a block diagram showing the configuration of the aspect. In the diagram, reference symbol 101 denotes an image input portion that inputs image data to be compressed. The input image data is internally retained. The image data that is retained in the image input portion 1 is sampled and quantized data. In the description that follows, each pixel of the image data is represented with an 8 bit luminance value (hereinafter, "luminance value of the pixel" will be referred to as "pixel value"). Reference symbol 102 denotes a block division portion that divides the image retained in the image input portion 101 into blocks. Reference symbol 103 denotes a first inclined plane calculation portion that calculates an inclined plane based on the pixel values of the outer edge parts of the divided blocks. Reference symbol 104 denotes an error amount calculation portion that calculates the error amount according to the difference between the inclined plane obtained by the first inclined plane calculation portion 3 and the respective pixel values in the blocks. Reference symbol 105 denotes a second inclined plane calculation portion that calculates a new inclined plane by only the pixels above a predetermined threshold value when an error amount calculated in an error amount calculation portion 4 exceeds this threshold value. Reference symbol 106 denotes an encoding portion that encodes the inclined plane obtained in the first inclined plane calculation portion 103, the error amount obtained in the error amount calculation portion 104, and the inclined plane obtained in the second inclined plane calculation portion 105. Reference symbol 107 denotes an image output portion that outputs compressed image data by multiplexing the encoded data of the respective blocks.

Figure 2:
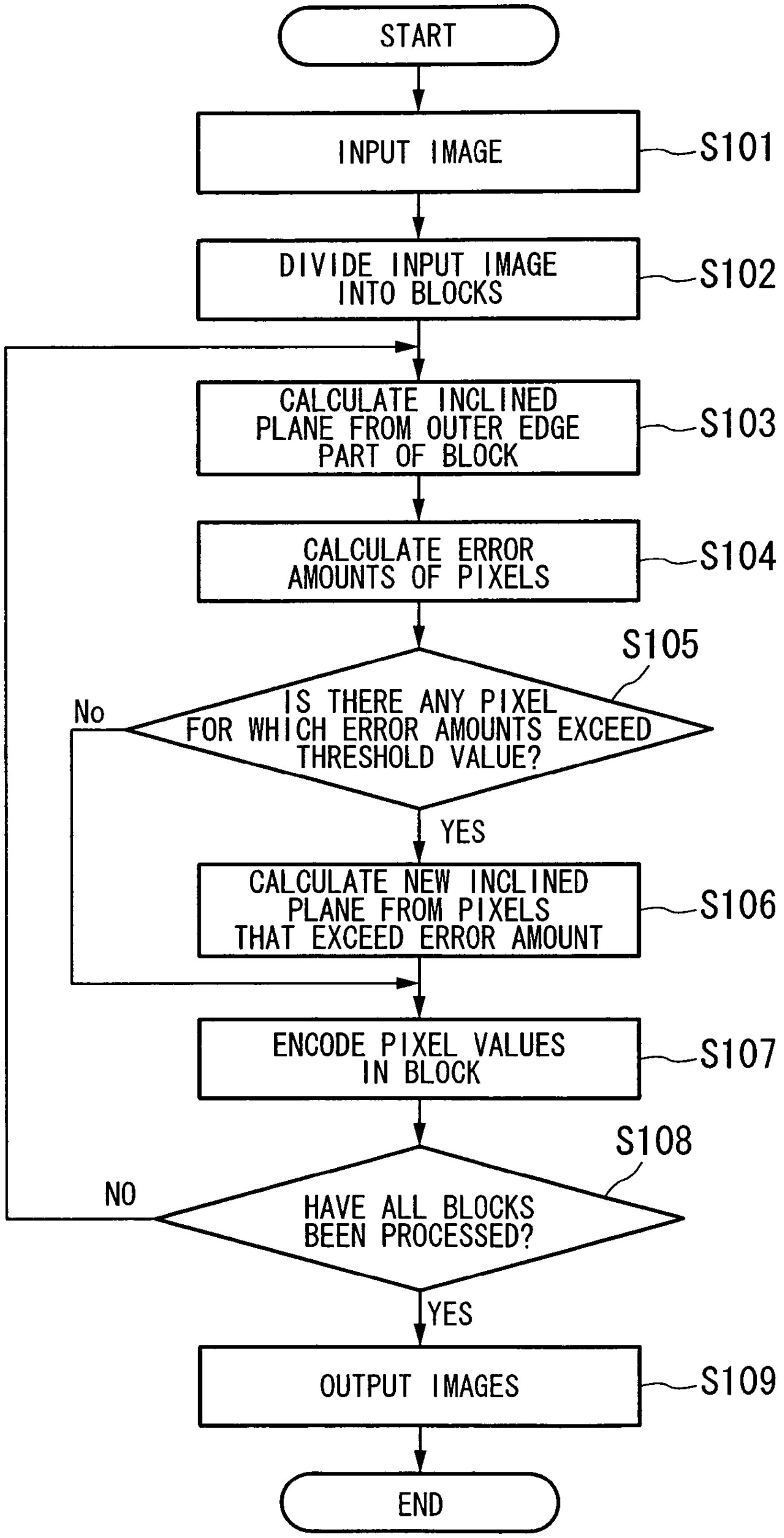
FIG. 2 is a flow chart showing an operation of the device shown in FIG. 1.

Next, the operation of the image compression device shown in FIG. 1 is described, with reference to FIG. 2. FIG. 2 is a flow chart showing an image compression operation of the image compression device shown in FIG. 1. First, image data is inputted into the image input portion 101, and retained therein (step S111). The image data retained in the image input portion 101 is data of a sampled and quantized data video signal and so forth, expressed with positions of pixels (x, y) and luminance values (0 to 255).

Next, the block division portion 102 divides the input image into blocks in response to the image data having been retained in the image input portion 101 (step S112). The input image here is assumed to be divided into 4×4 pixel blocks in order to simplify the description. As a result of this division process, for example a 32×32 pixel input image would be divided into 64 blocks. The result of the input image division is retained in the block division portion 102. Moreover, the number of pixels of the block in the X direction and the Y direction does not have to be equal and may be determined based on the number of pixels of the entire image.

Figure 3:
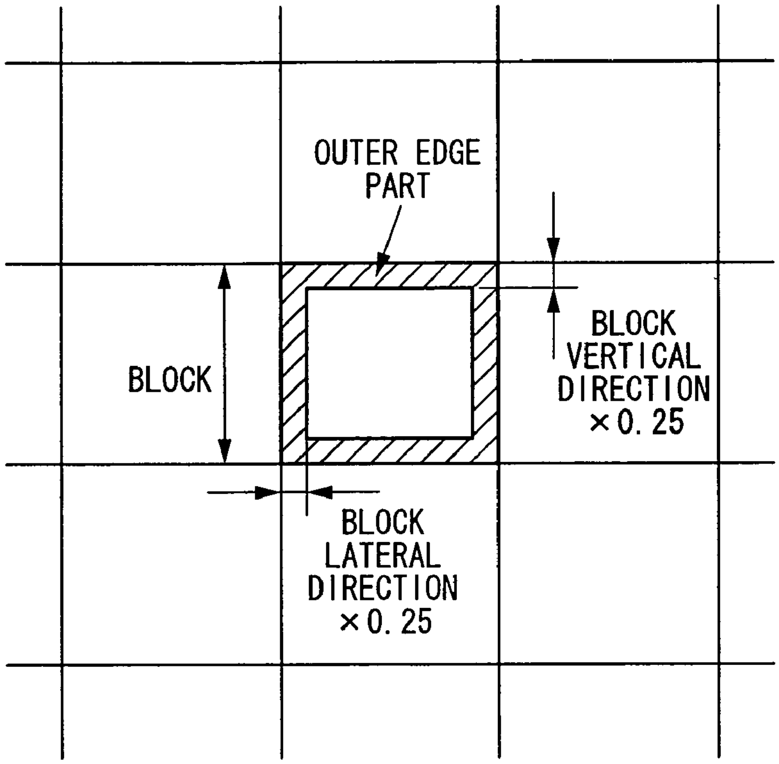
FIG. 3 is an explanatory diagram showing the outer edge part of a block.

Next, the first inclined plane calculation portion 103 reads the pixel values in one block among the blocks that have been divided in the block division portion 102. Then, an inclined plane is calculated from the pixel values of the outer edge part of the read block (step S103). Here, "inclined plane" refers to a plane surface including a horizontal surface. Also, as shown in FIG. 3, the outer edge part is taken as being 25% of the pixels from the top end of the block in a vertical direction, 25% of the pixels from the left end of the block in a lateral direction, 25% of the pixels from the bottom end of the block in a vertical direction, and 25% of the pixels from the right end of the block in a lateral direction, and is configured such that the number of pixels of the outer edge part and the number of pixels of the center part surrounded by the outer edge part are the same in both the vertical and the lateral directions. For example, this value (25% of the pixels) is applied in the case where the present invention is used for an application such as a time-lapse security video having a large computational capacity and a low refresh rate. On the other hand, for applications where the processing amount is comparatively great given the capacity of the device, such as a hand held device not having a large computational capacity, or a high speed measuring device that compresses images at a high refresh rate and the like, the emphasis is on the ability to reduce the calculation amount notwithstanding the precision of the images, and the outer edge part is taken as being one pixel from the respective top, bottom, left, and right ends regardless of the size of the block.

Figure 4:
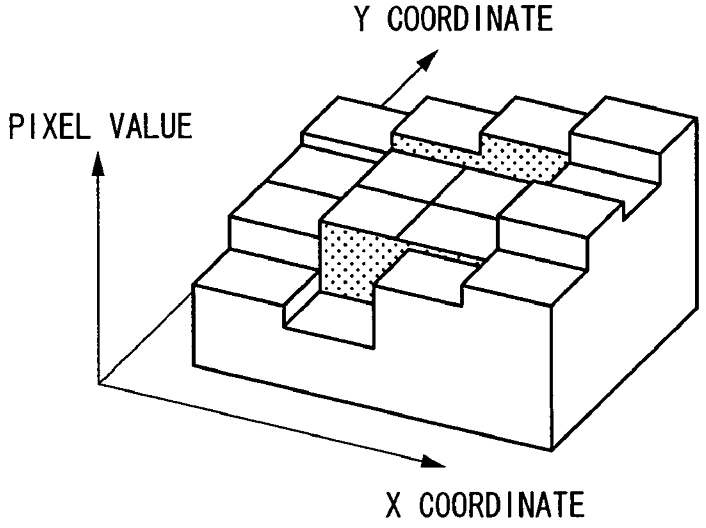
FIG. 4 is an explanatory diagram showing a pixel value with a schematic drawing.
Figures 5, 6A, 6B, 7:
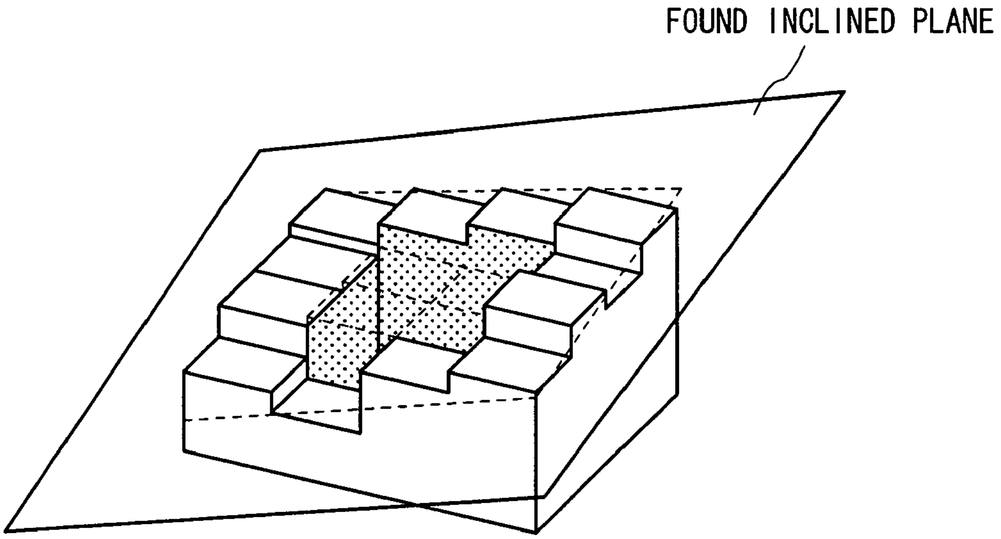
FIG. 5 is an explanatory diagram showing an inclined plane to be found.
FIGS. 6A and 6B are explanatory diagrams showing a method of calculating an inclination.
FIG. 7 is an explanatory diagram showing one example of block data.

Here, the method by which the first inclined plane calculation portion 103 calculates the inclined plane is described. For example, expressed in a schematic diagram, the pixel values in a block of 4×4 pixels appear as in FIG. 4. Then, finding the inclined plane from these pixel values taking notice of only pixel values of the outer edge part and excluding the 4 pixels of the center part, an inclined plane such as the one shown in FIG. 5 is found. The inclined plane is expressed by a center value of the inclined plane, a gradient in the X direction, and a gradient in the Y direction. As shown in FIG. 6A, the gradient in the X direction is taken as being a value (truncated after the decimal point) given by subtracting the average value of the outer edge part along the right end of the block (the part indicated with a "–" symbol) from the average value of the outer edge part along the left end of the block (the part indicated with a "+" symbol). Also, as shown in FIG. 6B, the gradient in the Y direction is taken as being a value (truncated after the decimal point) given by subtracting the average value of the outer edge part indicated with a "–" symbol from the average value of the outer edge part indicated with a "+" symbol. Moreover, the center value of the inclined plane is found from the average value of the pixel values of the outer edge part (rounded off after the decimal point).

Next, giving a specific example, a calculation method for finding the center value of the inclined plane, the gradient in the X direction, and the gradient in the Y direction is described. FIG. 7 shows one example of a divided block. The values shown in FIG. 7 are pixel values of respective pixels. First, the average value of the left end of the outer edge part is found: (24+21+14+11)/4=17.5. Next, the average value of the right end of the outer edge part is found: (54+51+44+41)/4=47.5. Finding the gradient in the X direction from these two average values yields: 17.5–47.5=–30. Similarly, the average values of the top end and the bottom end are (24+36+44+54)/4=39.5 and (11+10+29+41)=22.75. The gradient in the Y direction is 39.5–22.75=16 (truncated after the decimal point). Meanwhile, the center value of the inclined plane is (24+36+44+54+21+51+14+44+11+10+29+41)/12=32 (truncated after the decimal point).

As a result, the gradient in the X direction –30, the gradient in the Y direction 16, and the center value of the inclined plane 32, are obtained as parameters that represent the inclined plane.

Furthermore, the inclined plane may be calculated by a known method for plane calculation, so that plane defining parameters found for example by the least squares method may be used.

Figures 8, 9, 10:
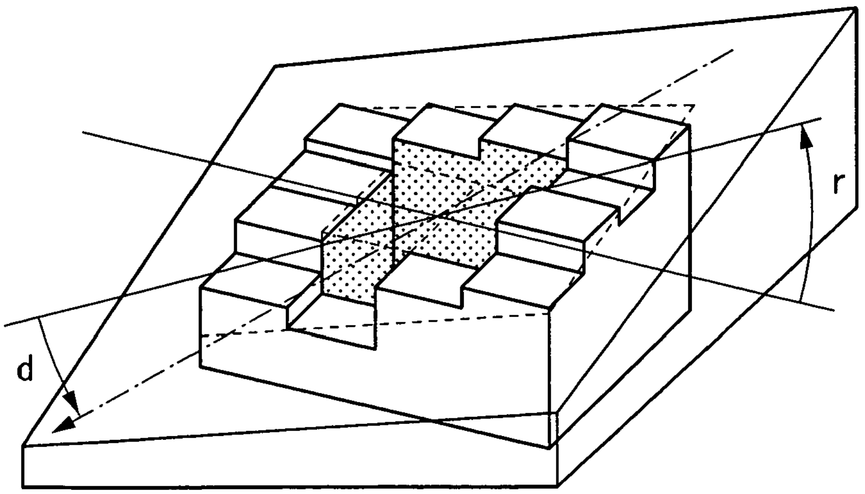
FIG. 8 is an explanatory diagram showing expressions of respective pixels.
FIG. 9 is an explanatory diagram showing respective pixel values of a first inclined plane.
FIG. 10 is an explanatory diagram showing another method for defining an inclined plane.

Then, the values of the respective pixels in the case where the inclined plane based on the previously found parameters is expressed in the block are found. Expressions for calculating the respective pixel values are shown in FIG. 8. In FIG. 8, the symbol m denotes the center value of the inclined plane (32 in this example), the symbol dx denotes the gradient in the X direction divided by the number of pixels of the block in the X direction (−7.5 in this example), and the symbol dy denotes the gradient in the Y direction divided by the number of pixels of the block in the Y direction (4 in this example). The result of finding the respective pixel values by the expressions shown in FIG. 8 (rounded off after the decimal point) is shown in FIG. 9. By this process, the inclined plane has been found from the outer edge parts.

Moreover, for the method of defining the inclined plane, a method as shown in FIG. 10 may be used, in which the direction of the greatest gradient is found (horizontal rotation angle indicated with a thick arrow in FIG. 10), and the gradient along the direction is calculated, to find a center of the inclined plane (average value) m, a gradient direction r, and a gradient amount d.

Next, once the first inclined plane calculation portion 103 has found the inclined plane, the error amount calculation portion 104 calculates the error amounts of the respective pixels (step S104). The term "error amount" here refers to the value indicating the difference between the actual pixel values in the block and the previously found inclined plane, and is the value given by subtracting the pixel values of the inclined plane shown in FIG. 9 from the actual pixel values shown in FIG. 9. Specifically, when the actual value in the block is taken as being B (x, y), the value based on the inclined plane as S (x, y), and the error amount as R (x, y), then the error amount is calculated by R (x, y)=B (x, y)−S (x, y). Here, x and y are pixel positions in the block, being integers 1 through 4. FIG. 11 shows each error amount found by this expression. By this process, the error amounts between the respective pixels in the block and the inclined plane are found.

Next, once the error amount calculation portion 104 has found the error amount, the second inclined plane calculation portion 105 determines, for each of the error amounts found, whether or not there is any pixel for which the absolute value of the respective error amounts exceeds a predetermined threshold value (step S105). The threshold value used here is the greater of either the average value of the absolute value of the error amount, (the quotient of the sum of all absolute values of error amounts divided by 16, this being the number of pixels in the block) or 2.5% of the value that can be expressed in number of bits in the quantizing pixel value, (in the case of 8 bit, 255×0.025=6). A variation between ½ and 2 times of this value of 2.5% may used according to the required level of precision of the image, so as to be smaller when a more detailed image quality is required. This amount of variation is an allowable range set between 2.5×½ and 2.5×2, since the smallest quantity of image variation that a human can detect in an image with variation is 1.25%, and a human cannot ignore 5% of image variation quantity in the structure of an image, and the exponential intermediate value of 2.5 is taken as a standard value.

In the example shown in FIG. 11, since the average value of the absolute value of the error amount is 4.3, and 2.5% of the value that may be expressed in 8 bit is 6, the threshold value is taken as 6. If as a result of this determination there is no pixel that exceeds the threshold value, the process proceeds to step S107. By determining pixels that exceed the threshold value based on the error amount shown in FIG. 11, the pixels shown in FIG. 12 are extracted. In the case where there are any pixels that exceed the threshold value, the second inclined plane calculation portion 105 calculates a new inclined plane based only on the pixels that exceed the error amount (step S106). The inclined plane can be calculated using an already known calculation method such as the least squares method. At this point, in the case where the number of pixels for calculating the second inclined plane is 2 or less, or where they are aligned on a straight line, the difference in the X coordinates and the difference in the Y coordinates are found for the two pixels that are distanced furthest from each other, and the direction of the smaller difference is assumed to have no gradient, and the parameters of a plane are found only for the coordinate axis having the, greater difference in distance. Furthermore, in the case where the number of non-associated pixels is 1, the parameters are found for a plane having a gradient of 0.

Next, the second inclined plane calculation portion 105 finds the values of the respective pixels in the case where the inclined plane found here is expressed in the block. FIG. 13 shows the values of the respective pixels in the case where the inclined plane found based on four pixel values is expressed in the block. The parameters for defining this inclined plane are the X direction gradient, the Y direction gradient, and the center value, as with the inclined plane described above.

By the above processes, two inclined planes (inclined planes shown in FIG. 9 and FIG. 13), namely; the inclined plane calculated from the pixel values of the outer edge part of the block (herein after referred to as a first inclined plane), and the inclined plane calculated from the pixel values for which error amounts exceed a threshold (herein after referred to as second inclined plane), are obtained.

Note that, although in the above description, it has been described on the assumption that pixel values in the block are approximated using two inclined planes, an error amount from the second inclined plane may also be found, and a third inclined plane may be calculated if there is any pixel that exceeds the predetermined threshold value. At this point, in the case where the number of inclined planes to be calculated needs to be determined, the process may be made to stop when the number of pixels for which error amounts exceed a predetermined threshold becomes equal to or less than a predetermined number. This is effective in the case where the number of pixels in the block becomes large.

Next, once two inclined planes have been found, an encoding portion 106 encodes pixel values in the block by encoding the two inclined planes (step S107). In the encoding, the two inclines found previously may be respectively encoded. However, in order to find more accurate approximate data, it is determined to which inclined plane the respective pixels belong. The determination of the associated inclined planes is as follows: a pixel is determined to be associated with the first inclined plane when, |pixel value−first inclined plane value |≦| pixel value−second inclined plane value|, and a pixel is determined to be associated with the second inclined plane when, |pixel value−first inclined plane value |>| pixel value−second inclined plane value|. Then, an associated inclined plane map is created in which pixels associated with the first inclined plane are "0" and pixels associated with the second inclined plane are "1". An example of this associated inclined plane map is shown in FIG. 14. Furthermore, in the case where the number of inclined planes used for approximation is 3 or more, the values of the associated inclined plane map may have multiple values in accordance with the number of the inclined planes.

Next, the encoding portion 106 performs reversible compression by carrying out entropy coding of, the respective parameters (X direction gradient, Y direction gradient, and center value of the inclined plane in this example) expressing the two inclined planes found previously (first inclined plane and second inclined plane), the number of inclined planes (2 in this example), and the associated inclined plane map. Huffman coding, arithmetic signing, the Range Coder method, and so forth can be used for the entropy coding. Moreover, these methods may be used separately for respective data.

Next, by performing the encoding process for a single block with respect to all blocks (step S108), the entire image is encoded. Then, the image output portion 107 multiplexes and outputs the respective encoded data (step S109).

Moreover, a method for performing a batch entropy coding by providing a buffer for accumulating data prior to the entropy coding, a method for block encoding, or a method for sequentially performing the entropy coding as data is output by quantization, and accumulating the results thereof may be used. Moreover, in the case of processing a motion image, it is preferable to achieve a reduction in data size by employing a third aspect of the present invention.

Next, the operation of decoding an image that has been encoded with the above method is briefly described. First, the parameters expressing the first inclined plane and the second inclined plane, the number of inclined planes, and the associated inclined plane map are decoded by entropy decoding. Then, having reconstructed the inclined planes based on the parameters of the inclined planes, the inclined planes shown in FIG. 9 and FIG. 13 can be reconstructed. When the pixel values in the block are reconstructed by making reference to the data of these two inclined planes and the associated inclined plane map, the pixel values shown in FIG. 15 can be reconstructed.

The resulting image (pixel values shown in FIG. 15) contains errors compared to the original image (pixel values shown in FIG. 7). However, the gradient conditions of the entire image are stored (luminance becomes greater towards top right), and it would be recognized as an image very similar to the original image when seen as a part of a large image. Moreover, it is rare for data in an actual image to vary as much as shown in this example in a range as small as 4×4 pixels, and even in this case the visual characteristics are clearly retained.

Figure 16A:
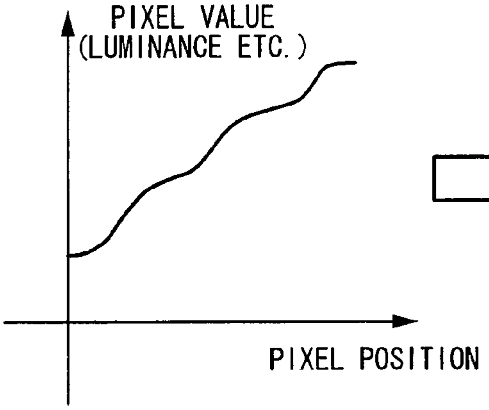
FIGS. 16A and 16B are explanatory diagrams showing the effect of an image compression method according to the present invention.
Figure 16B:
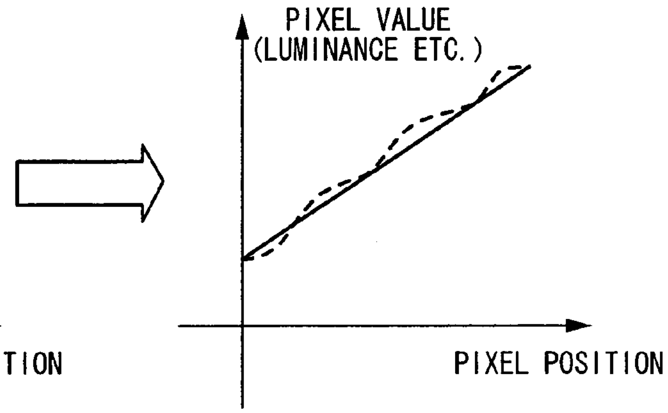

Accordingly, in the case where image compression is performed on an original image having some fluctuations in pixel values inclined in a gradation part (FIG. 16A), the parameters of an inclined plane that fits the gradation are abstracted as shown in FIG. 16B, and since the image is reproduced by this inclined plane upon reconstruction, and the fluctuated parts of the inclined plane included in the gradation are variances of a degree not detectable to the human eye, an image having sensuously highly reproduced gradation parts can be obtained.

Figure 17A:
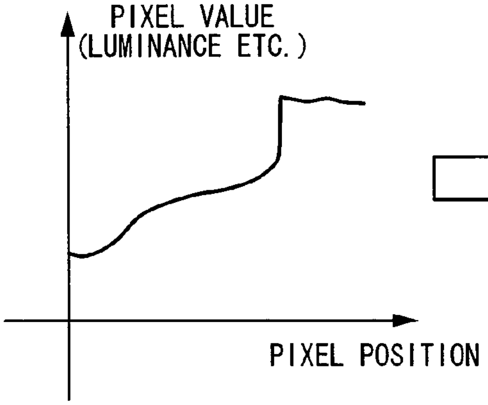
FIGS. 17A, 17B, and 17C are explanatory diagrams showing the effect of the image compression method according to the present invention.
Figure 17B:
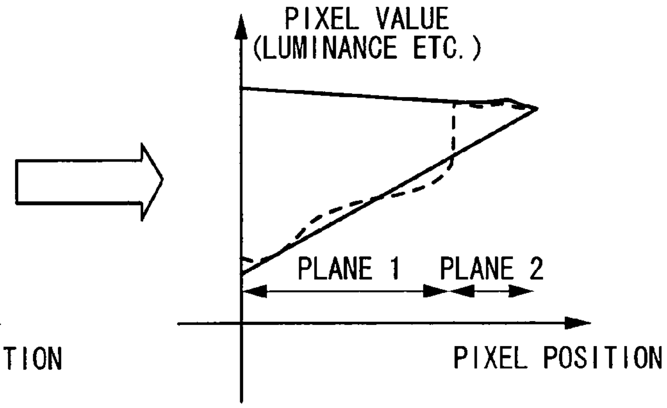
Figure 17C:
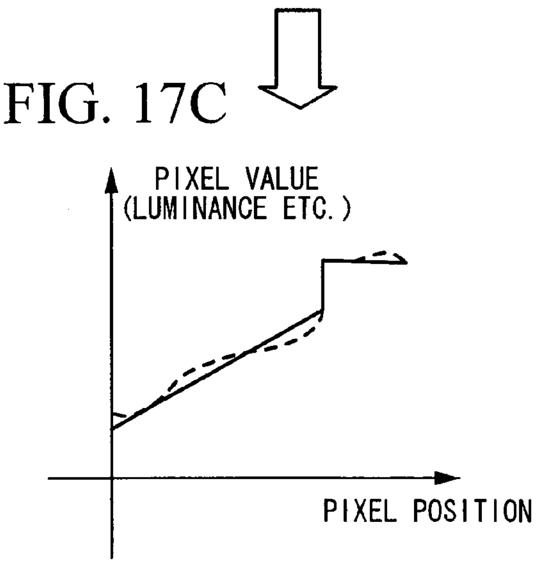

Moreover, even on the edge of a color border as shown in FIG. 17A, the parameters of the inclined planes of the respective colors that fit the color variance in both areas divided by the border are found as shown in FIG. 17B. Furthermore, since the image is expressed along with information that shows to which area the respective pixels belong, when reconstructing the image, two color inclined planes are pre-reproduced, and each pixel can be separately color-filled as an inclined plane of the color specified in the corresponding association information (FIG. 17C). Although there are some fluctuations in each area separated by the color border even in the color border as is the case of gradation, the human eye is unlikely to notice small fluctuations since their attention is drawn to strong fluctuations such as edges. As a result, an image having high reproducibility can be obtained.

Figure 18A:
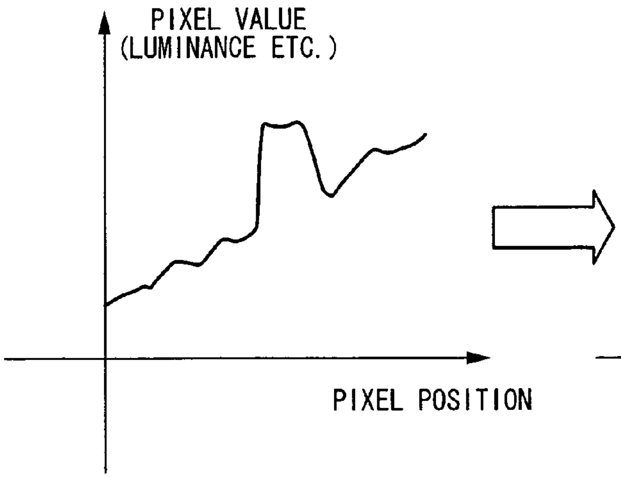
FIGS. 18A, 18B, and 18C are explanatory diagrams showing the effect of the image compression method according to the present invention.
Figure 18B:
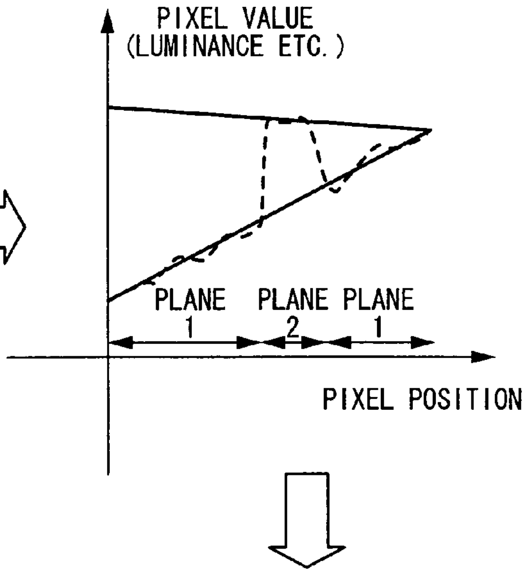
Figure 18C:
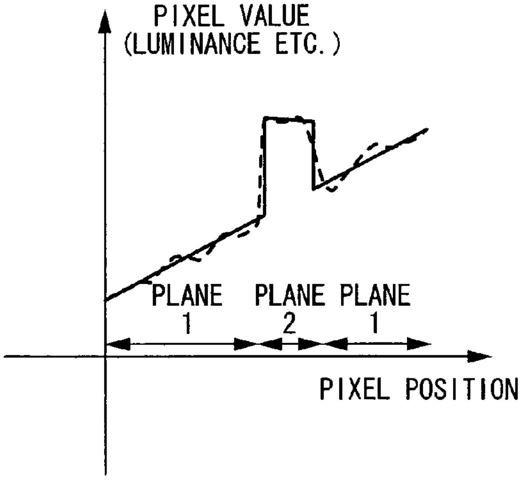

Moreover, in an image having a line of different color superposed on a background as in FIG. 18A, since the parameters of the inclined plane of the color (pixel value) that fits the background, and the parameters of the inclined plane of the color (pixel value) that fits the line are found, and furthermore, the association information that shows to which inclined plane each individual pixel belongs is obtained as the parameters that show the block image, on reconstruction, two color inclined planes are pre-reproduced and each pixel can be color-filled as a color inclined plane that the corresponding association information shows (FIG. 18C). Since the human eye tends to be drawn to the border between the line and the background, and the line shape and a small variance in color in the line are unlikely to be noticed, the part in the image where the background and the line are overlapping can be made sensuously highly reproducible.

Furthermore, when processing a large-sized image all at once, the case mentioned above of having conjoined image patterns needs to be supported. However, since the present invention independently performs processing in a small size block, a plurality of recognition patterns can hardly be intermixed in each processing, and by having a functionality of individually reproducing the above patterns in the block, it becomes possible to achieve a high reproducibility to the human senses with respect to the above mentioned three characteristics without having to perform complex calculations for extracting the structure in an image.

As described above, in the present invention, by having a functionality to compress an image while retaining high reproducibility with respect to the three characteristics to which the human eye tends to pay attention when recognizing an image, it is possible to perform irreversible compression having little reduction in visual image quality and ease of recognizing image content. Moreover, by taking an inclined plane that approximates the outer edge as a reference, there will not be a sharp color change at the joint of the blocks even where blocks with strong inclined planes are in a series. Therefore block border noise does not occur and image quality can be improved.

Moreover, the image compression process may be performed by recording a program for realizing the function of each of the processing portions in FIG. 1 onto a computer readable recording medium and loading and executing the program recorded on this recording medium on a computer system. The "computer system" here includes an operating system and a set of hardware such as peripheral devices. Moreover, the "computer system" also includes a WWW system provided with a homepage providing environment (or display environment). Also, the "computer readable recording medium" means a portable medium such as a flexible disk, a magnetic optical disk, a ROM or a CD-ROM, or a storage unit such as a hard disk built into the computer system. Furthermore, the "computer readable recording medium" includes a medium for holding the program for a predetermined time, such as a volatile memory (RAM) in a computer system such as a server or a client when the program is transmitted through a network such as the Internet or a communication line such as a telephone line.

Moreover, the program may be transmitted from a computer system storing the program in a storage unit or the like to another computer system through a transmission medium or by transmitted waves in the transmission medium. Here, the "transmission medium" for transmitting the program means a medium having a functionality of transmitting information, including a network (communication network) such as the Internet or a communication line (communication line) such as a phone line. In addition, the program may be for realizing a part of the above functions. Furthermore, the program may be a so-called difference file (difference program) which can realize the above functions in combination with a program which has been already recorded in the computer system.

As described above, according to the first aspect of the present invention, by having a functionality to compress an image while retaining high reproducibility with respect to the characteristics to which the human eye tends to pay attention when recognizing an image, an effect is obtained such that it is possible to perform irreversible compression having little reduction in visual image quality and ease of recognizing image content. Moreover, by taking an inclined plane that approximates the outer edge as a reference, there will not be a sharp color change at the joint of the blocks even where blocks with a strong inclination are disposed in a series. Therefore an effect can be obtained such that block border noise does not occur and image quality can be improved.

Hereinafter, an image compression device according to a second aspect of the present invention is described, with reference to FIG. 19 to FIG. 35.

Figure 19:
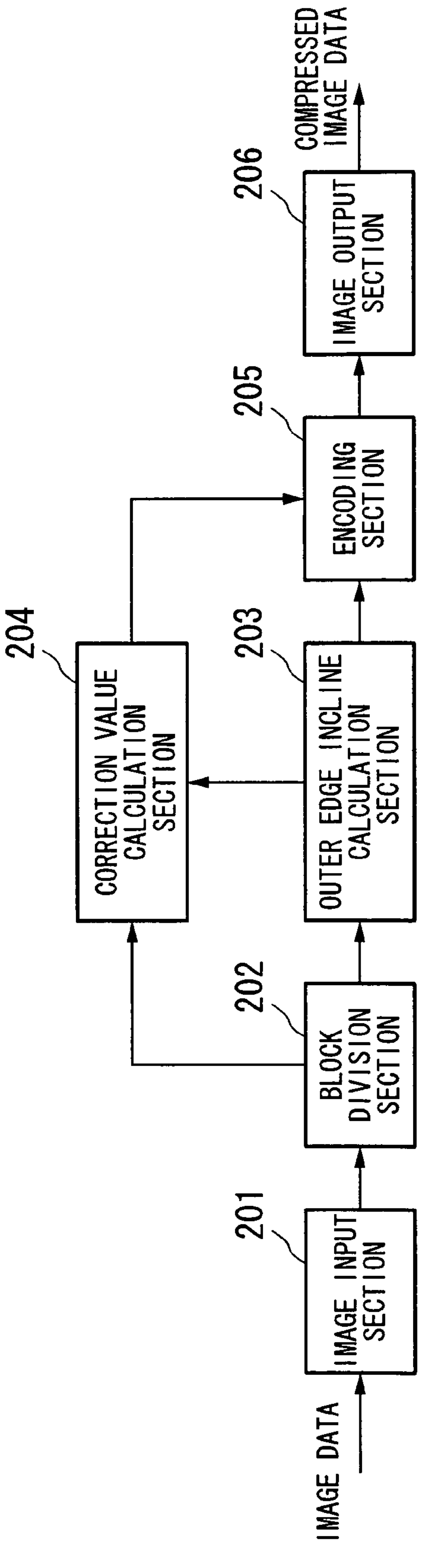
FIG. 19 is a block diagram showing a configuration of a second aspect of the present invention.

FIG. 19 is a block diagram showing the configuration of the aspect. In the diagram, reference symbol 201 denotes an image input portion that inputs image data to be compressed. The input image data is internally retained. The image data that is retained in the image input portion 201 is sampled and quantized data. In the description that follows, each pixel of the image data is represented with an 8 bit luminance value (hereinafter, "luminance value of the pixel" will be referred to as "pixel value"). Reference symbol 202 denotes a block division portion that divides the image retained in the image input portion 201 into blocks. Reference symbol 203 denotes an outer edge incline calculation portion that calculates an inclined plane based on the pixel values of the outer edge parts of the divided blocks. Reference symbol 204 denotes a correction value calculation portion that calculates the correction value according to the difference between the inclined plane obtained by the outer edge incline calculation portion 203 and the respective pixel values in the blocks. Reference symbol 205 denotes an encoding portion that encodes the inclined value obtained in the outer edge inclined plane calculation portion 203, and a correction value obtained in the correction value calculation portion 204. Reference symbol 206 denotes an image output portion that outputs compressed image data by multiplexing the encoded data of the respective blocks.

Figure 20:
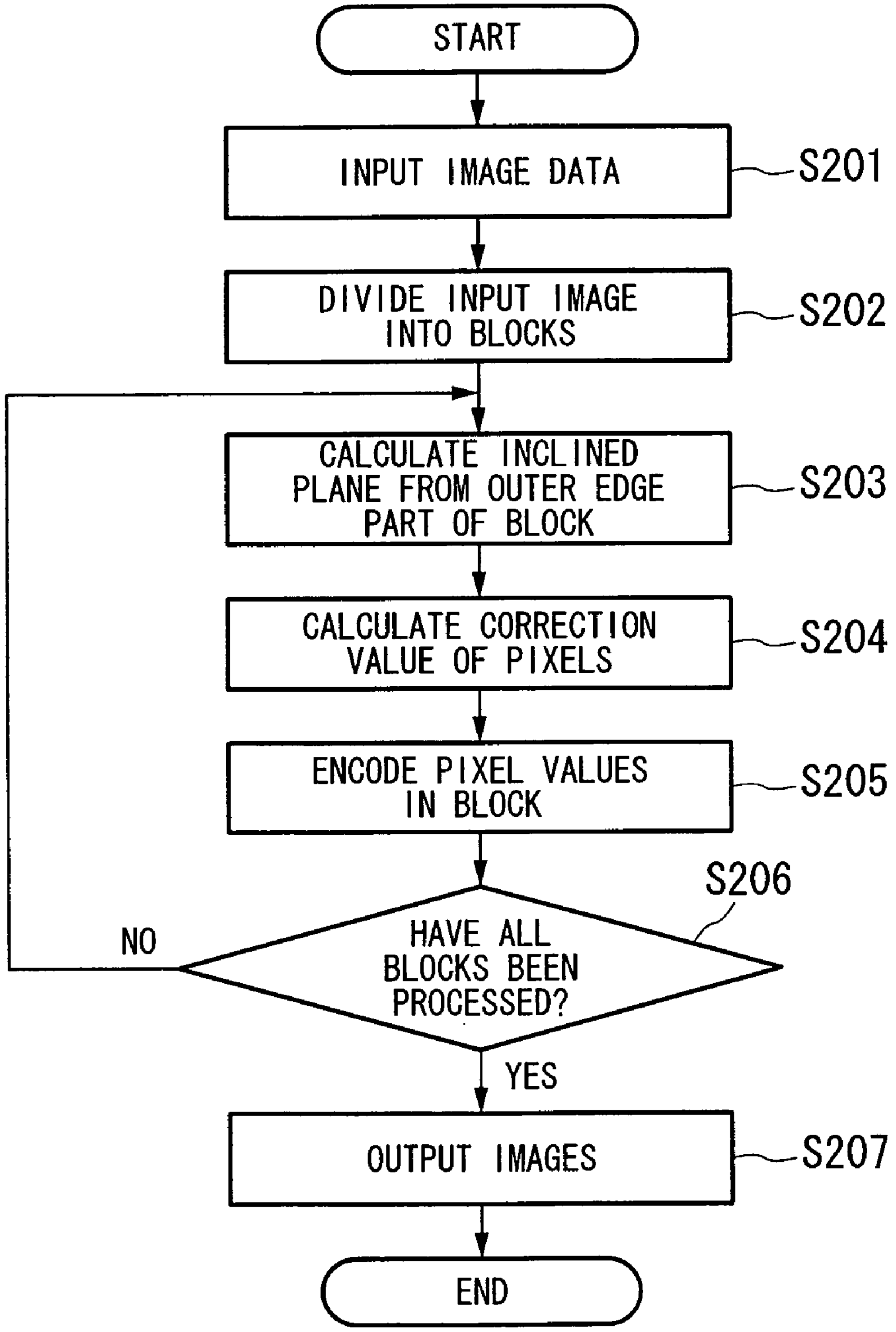
FIG. 20 is a flow chart showing an operation of the device shown in FIG. 12.

Next, the operation of the image compression device shown in FIG. 19 is described, with reference to FIG. 20. FIG. 20 is a flow chart showing an image compression operation of the image compression device shown in FIG. 19. First, image data is inputted into the image input portion 201, and retained therein (step S201). The image data retained in the image input portion 201 is data of a sampled and quantized data video signal and so forth, expressed with positions of pixels (x, y) and luminance values (0 to 255).

Next, the block division portion 202 divides the input image into blocks in response to the image data having been retained in the image input portion 201 (step S202). The input image here is assumed to be divided into 4×4 pixel blocks in order to simplify the description. As a result of this division process, for example a 32×32 pixel input image would be divided into 64 blocks. The result of the input image division is retained in the block division portion 202. Moreover, the number of pixels of the block in the X direction and the Y direction does not have to be equal and may be determined based on the number of pixels of the entire image.

Figure 21:
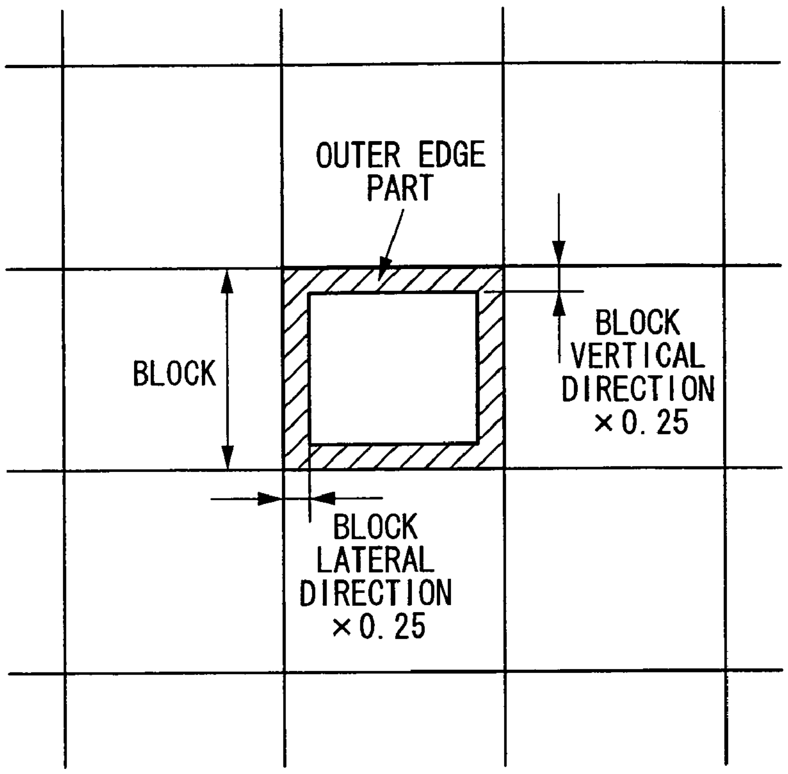
FIG. 21 is an explanatory diagram showing the outer edge part of a block.
Figure 22:
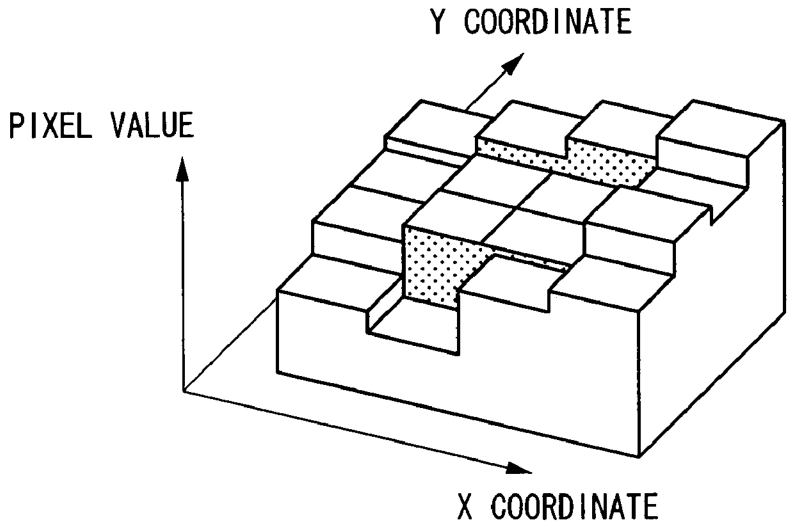
FIG. 22 is an explanatory diagram showing a pixel value with a schematic drawing.

Next, the outer edge incline calculation portion 203 reads the pixel values in one block among the blocks that have been divided in the block division portion 202. Then, an inclined plane is calculated from the pixel values of the outer edge part of the read block (step S203). Here, "inclined plane" refers to a plane surface including a horizontal surface. Also, as shown in FIG. 21, the outer edge part is taken as being 25% of the pixels from the top end of the block in a vertical direction, 25% of the pixels from the left end of the block in a lateral direction, 25% of the pixels from the bottom end of the block in a vertical direction, and 25% of the pixels from the right end of the block in a lateral direction, and is configured such that the number of pixels of the outer edge part and the number of pixels of the center part surrounded by the outer edge part are the same in both the vertical and the lateral directions. For example, this value (25% of the pixels) is applied in the case where the present aspect is used for an application such as a time-lapse security video having a large computational capacity and a low refresh rate. On the other hand, for applications where the processing amount is comparatively great given the capacity of the device, such as a hand held device not having a large computational capacity, or a high speed measuring device that compresses images at a high refresh rate and the like, the emphasis is on the ability to reduce the calculation amount notwithstanding the precision of the images, and the outer edge part is taken as being one pixel from the respective top, bottom, left, and right ends regardless of the size of the block.

Here, the method by which the outer edge incline calculation portion 203 calculates the inclined plane is described. For example, expressed in a schematic diagram, the pixel values in a block of 4×4 pixels appear as in FIG. 22. Then, finding the inclined plane from these pixel values taking notice of only pixel values of the outer edge part and excluding the 4 pixels of the center part, an inclined plane such as the one shown in FIG. 23 is found. The inclined plane is expressed by a center value of the inclined plane, a gradient in the X direction, and a gradient in the Y direction. As shown in FIG. 24A, the gradient in the X direction is taken as being a value (truncated after the decimal point) given by subtracting the average value of the outer edge part along the right end of the block (the part indicated with a "−" symbol) from the average value of the outer edge part along the left end of the block (the part indicated with a "+" symbol). Also, as shown in FIG. 24B, the gradient in the Y direction is taken as being a value (truncated after the decimal point) given by subtracting the average value of the outer edge part indicated with a "−" symbol from the average value of the outer edge part indicated with a "+" symbol. Moreover, the center value of the inclined plane is found from the average value of the pixel values of the outer edge part (rounded off after the decimal point).

As shown in FIG. 25, in the case where the average value of the center part in the block (non-outer edge part) is either extremely greater or smaller compared to the pixel value range (the range between the minimum pixel value and the maximum pixel value) of the outer edge part, an exceptional process is performed since it is highly likely to be convex or concave planes. During this exceptional process, the parameters of the inclined plane are set such that the inclined plane gradient=0 (for both X and Y) and the center of the inclined plane is the average value of all pixels in the block.

Figures 26, 27, 28, 29:
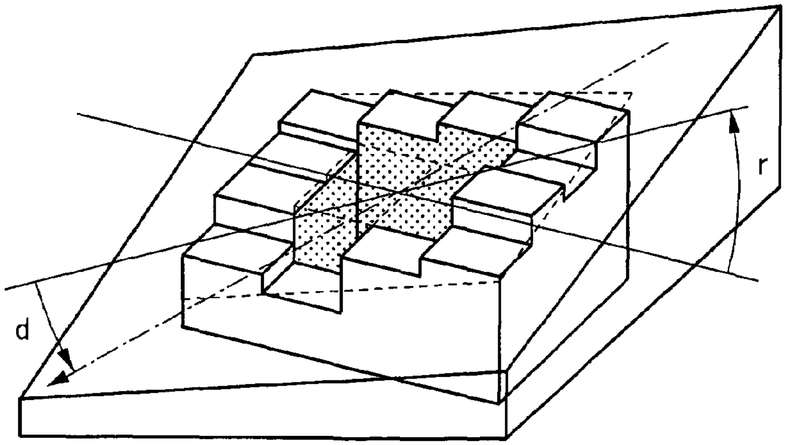
FIG. 26 is an explanatory diagram showing one example of block data.
FIG. 27 is an explanatory diagram showing expressions of respective pixels.
FIG. 28 is an explanatory diagram showing respective pixel values of an inclined plane.
FIG. 29 is an explanatory diagram showing another method for defining an inclined plane.
Figure 34:
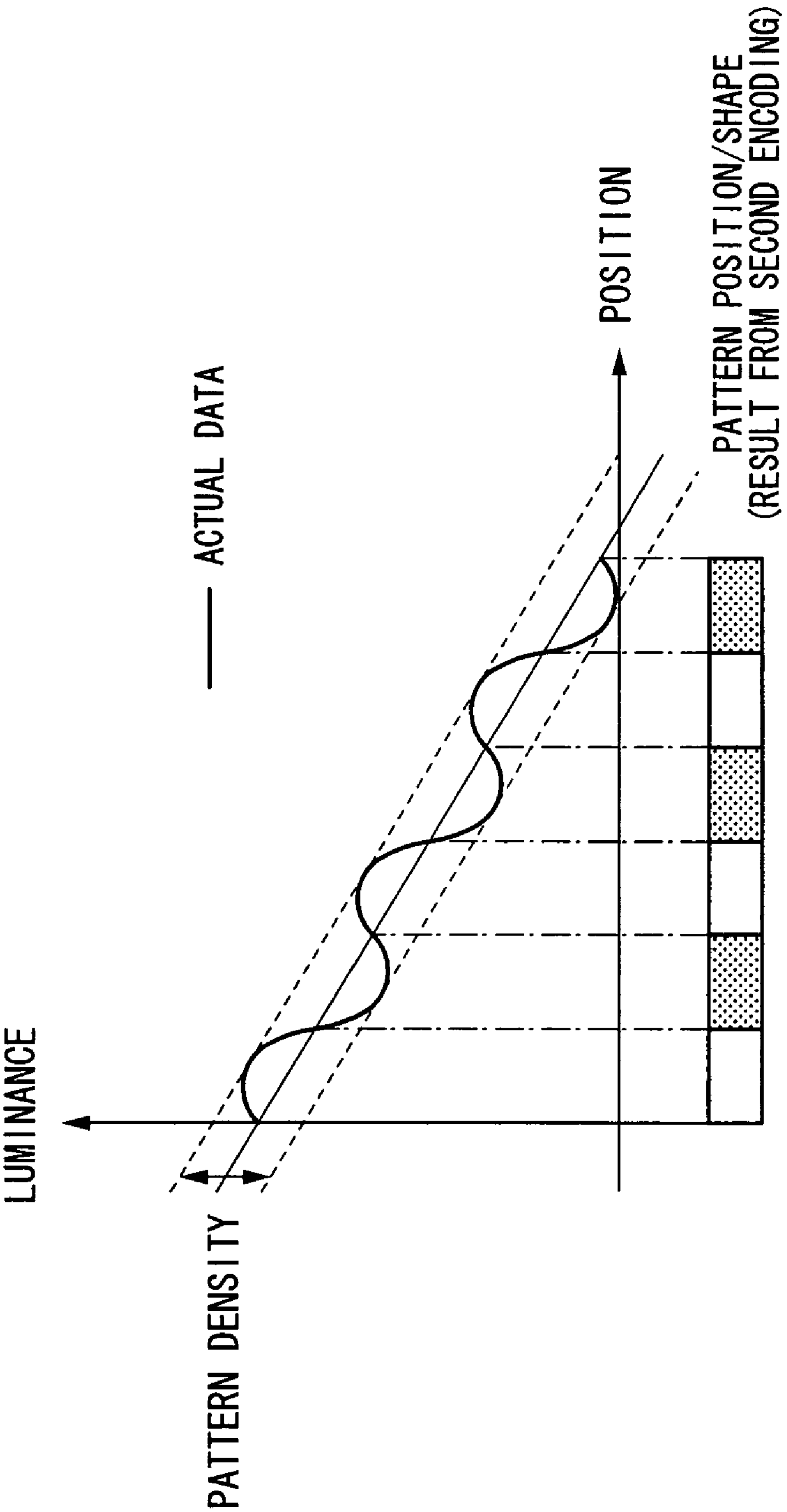
FIG. 34 is an explanatory diagram showing the effect of irreversible encoding of correction values.
Figure 35:
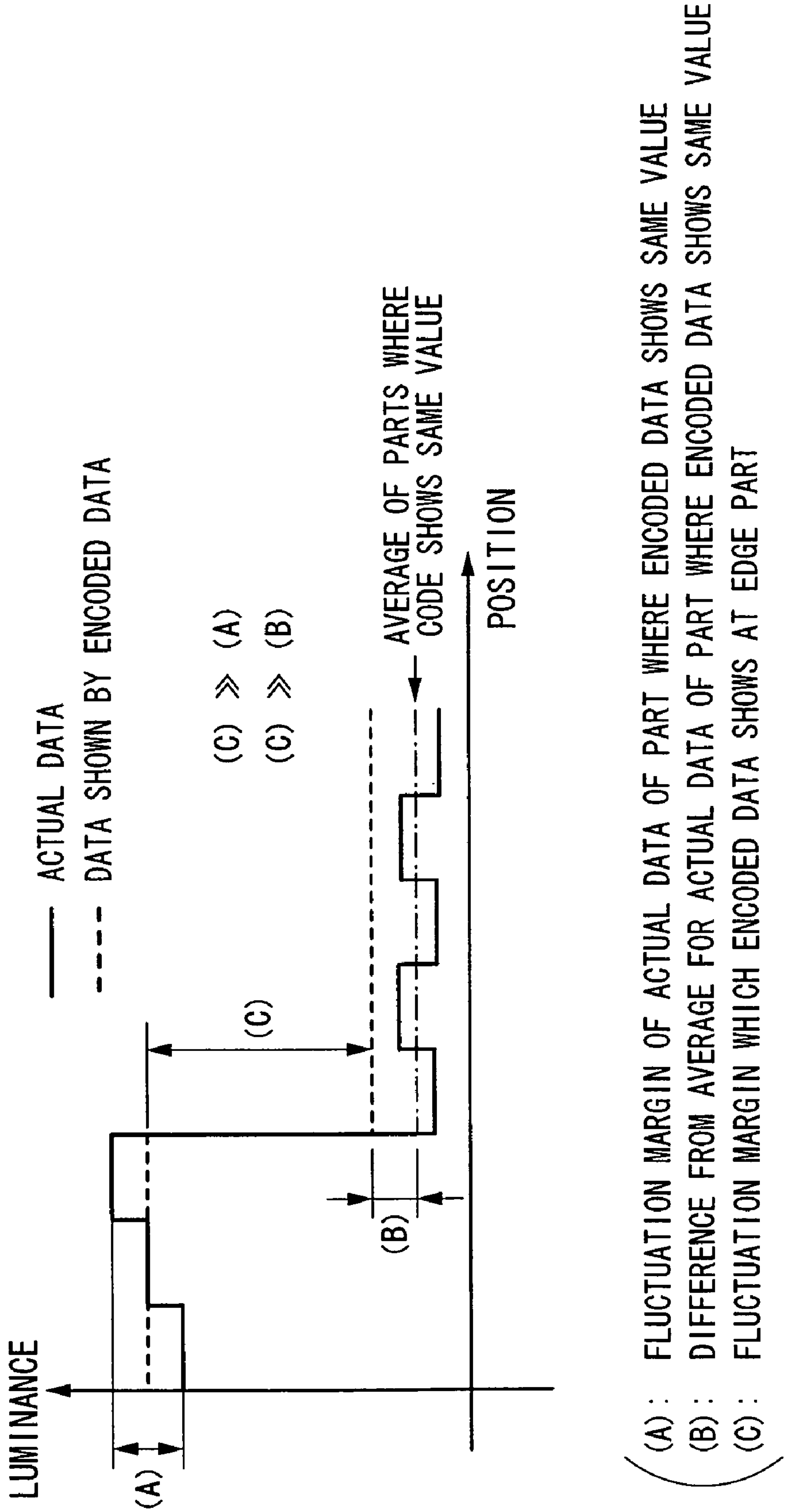
FIG. 35 is an explanatory diagram showing the effect of irreversible encoding of correction values.

Next, giving a specific example, a calculation method for finding the center value of the inclined plane, the gradient in the X direction, and the gradient in the Y direction is described. FIG. 26 shows one example of a divided block. The values shown in FIG. 26 are pixel values of respective pixels. First, the average value of the left end of the outer edge part is found: (24+19+16+9)/4=17. Next, the average value of the right end of the outer edge part is found: (54+49+46+39)/4=47. Finding the gradient in the X direction from these two average values yields: 17−47=−30. Similarly, the average values of the top end and the bottom end are (24+40+44+54)/4=40.5 and (9+21+27+39)=24. The gradient in the Y direction is 40.5−24=16 (truncated after the decimal point). Meanwhile, the center value of the inclined plane is (24+40+44+54+19+49+16+46+9+21+27+39)/12=32 (truncated after the decimal point). Furthermore, since the range of the values for the outer edge part is 9 to 54, the average of the pixels (39+40+40+42)/4=40.25 for the pixels not at the outer edge portion is included. Therefore, the exceptional process for the convex or concave planes is not executed.

As a result, the gradient in the X direction −30, the gradient in the Y direction 16, and the center value of the inclined plane 32, are obtained as parameters that represent the inclined plane.

Then, the values of the respective pixels in the case where the inclined plane based on the previously found parameters is expressed in the block are found. Expressions for calculating the respective pixel values are shown in FIG. 9. In FIG. 27, the symbol m denotes the center value of the inclined plane (32 in this example), the symbol dx denotes the gradient in the X direction divided by the number of pixels of the block in the X direction (−7.5 in this example), and the symbol dy denotes the gradient in the Y direction divided by the number of pixels of the block in the Y direction (4 in this example). The result of finding the respective pixel values by the expressions shown in FIG. 27 (rounded off after the decimal point) is shown in FIG. 28. By this process, the inclined plane has been found from the outer edge parts.

Moreover, for the method of defining the inclined plane, a method as shown in FIG. 29 may be used, in which the direction of the greatest gradient is found (horizontal rotation angle indicated with a thick arrow in FIG. 29), and the gradient along the direction is calculated, to find a center of the inclined plane (average value) m, a gradient direction r, and a gradient amount d.

Next, once the outer edge incline calculation portion 203 has found the inclined plane, the correction value calculation portion 204 calculates the correction values of the respective pixels (step S203). The term "correction value" here refers to the value indicating the difference between the actual pixel values in the block and the previously found inclined plane, and is the value given by subtracting the pixel values of the inclined plane shown in FIG. 28 from the actual pixel values shown in FIG. 26. Specifically, when the actual value in the block is taken as being B (x, y), the value based on the inclined plane as S (x, y), and the correction value as R (x, y), then the correction value is calculated by R (x, y)=B (x, y)−S (x, y). Here, x and y are pixel positions in the block, being integers 1 through 4. FIG. 30 shows each correction value found by this expression. By this process, the correction values for the respective pixels in the block are found.

Next, once the correction value calculation portion 204 has found correction values, the encoding portion 205 encodes the pixel values within the block (step S205). In the encoding, the previously found correction values are binarized based on whether they are positive values or negative values. The result obtained from this binarization process is called a correction map. FIG. 31 is one example of a correction map that has been obtained by binarizing the correction values shown in FIG. 30. In FIG. 31, "1" shows that the correction values are a positive value, and "0" shows that the correction values are a negative value. Then, the average of the absolute value of the positive correction values and the average of the absolute value of the negative correction values are calculated, and the weighted average of these two values are found. These are taken as an amplitude index that shows the size of the correction values. In the example shown in FIG. 30, there are 7 pixels in a positive part, and the absolute average value is |46/7|=6.6. Moreover, there are 9 pixels in the negative part, and the absolute average value is |−34/9|=3.3. The weighted average value of these is (6.6×7+3.3×9)/16=5. In addition, the root-mean-square $$\sqrt{\frac{1}{n-m}\sum(x, y)^2}$$

may be employed instead of an average of the absolute values, for the method for indexing the size of this correction value.

In this way, the correction values of each block can be expressed in a total of 24 bits: 16 bits for the correction map, and 8 bits for the amplitude index.

Moreover, in the case where the correction values are large, the data reduction process is carried out further. For example, in the case where the correction values are sufficiently greater than the gradients of the X and Y directions and there is an instruction to correct for pixel value variance greater than or equal to 1.5 times the gradient (a value that can absorb fluctuations due to error) of 1 pixel in the direction having a greater variance from among the X and Y directions as an amplitude index, the part visually affected due to the correction values of an undulation becomes greater. In this case, data having the gradient 0 (in the X and Y directions) is created, and re-calculation of the correction values and re-encoding of the correction values are performed. As a result, the probability of occurring at 0 is further increased for the values of the gradient data that have originally had values close to 0 occurring at high probability, and thereby, the data quantity after the entropy coding, which is performed later, is reduced without making a significant visual change to the image in reproduction. The condition for deleting the gradient is the case where: the maximum value of the respective gradients of the X and Y directions (Max (dx, dy))/block width×1.5, is smaller than the amplitude index.

Moreover, in the case where the amplitude index is small, still further data reduction processing is performed. For example, there may be a case where the correction values are small and the effect of the correction is visually insignificant. That is to say, in the case where the amplitude index found previously is smaller than the variance that cannot be visually detected in a general image, the data is reduced without making a significant visual change to the reconstructed image by not generating data for the correction process. In this method of reduction, the correction quantity is shown as 0 when reducing, and the correction map is not included in the data when the correction quantity is 0. As a result, 2 bytes for the correction map can be reduced. During reconstruction, the correction map reading is skipped with an index of the correction quantity 0, and the reduction is reproduced by taking all correction values as 0. Here, the visually non-identifiable variance is a result obtained experimentally, and refers to a variance of approximately one part in sixty (4 when the pixel value is 8 bit) of the possible data value range (256 when the pixel value is 8 bit). By varying these values to be ignored as necessary, taking as a parameter one twentieth of the range of the values (a value found by an experiment to find the minimum value of variance in an image that would attract attention), and by trading off an increase in the data reduction quantity in return for the degradation of an image quality that is more noticeable than in the case of the above setting, the balance between the image quality and the compression ratio may be varied.

In this example, the amplitude index is 5, giving, amplitude index (5)<value of greater incline quantity (7.5)×1.5, which does not correspond to the case where the above amplitude index is large. Also, in the case where the amplitude index is 5, since it is not smaller than 4 (visually non-identifiable variance quantity), this does not correspond to the case where the above correction values are to be deleted. Therefore, the values that have encoded the correction values are encoded as the following values in 16 bit and 8 bit.

Correction map=1011 1011 0000 1011 (binary number)

Amplitude index=5 (decimal number)

Next, the encoding portion 205 further reduces the data quantity by performing entropy coding for the five values found previously, namely; the center value of the inclined plane, the gradient in the X direction, the gradient in the Y direction, the amplitude index, and the correction map. Since the occurrence frequency of these five values is biased, a further reduction in data quantity can be achieved by performing entropy coding. Huffman coding, arithmetic coding, Range Coder method and the like may be employed here as encoding methods.

Next, by performing the encoding process for a single block with respect to all blocks (step S206), the entire image is encoded. Then, the image output portion 206 multiplexes and outputs the respective encoded data (step S206).

Moreover, a method for performing a batch entropy coding by providing a buffer for accumulating data prior to the entropy coding, a method for block encoding, or a method for sequentially performing the entropy coding as data is output by quantization, and accumulating the results thereof may be used. Moreover, in the case of processing a motion image, it is preferable to achieve a reduction in data amount by employing a third aspect of the present invention.

Next, the operation of decoding an image that has been encoded with the above method is briefly described. First, the entropy coded data is decoded. As a result, the five values, namely; the center value of the inclined plane, the gradient in the X direction, the gradient in the Y direction, the amplitude index, and the correction map are reconstructed. Then, the values of the respective pixels where the inclined plane is expressed within the block are found by the expression shown in FIG. 27. Since the center value of the inclined plane, the gradient in the X direction, and the gradient in the Y direction are irreversible data, the values of the respective pixels are the values shown in FIG. 28.

Next the addition and subtraction values are found based on the decoded correction map, and the amplitude index (here 5). If the value of the correction map is "1", then 1×amplitude index=5. If the value of the correction map is "0", then −1×amplitude index=−5. As a result, the addition and subtraction values for each of the respective pixels as shown in FIG. 32 are obtained. By adding these addition and subtraction values to the pixel values for the inclined plane shown in FIG. 28, the pixels inside the block are reconstructed. The pixel values of the images reconstructed by this process are shown in FIG. 33.

The resulting image (pixel values shown in FIG. 33) contains errors compared to the original image (pixel values shown in FIG. 26). However, the gradient conditions of the entire image (luminance becomes greater towards top right), or the visual characteristics being those for the part where there is a significant change (the pixel border with the thick solid line in FIG. 33), are stored, and it would be recognized as an image very similar to the original image when seen as a part of a large image. Moreover, it is rare for data in an actual image to vary as much as shown in this example in a range as small as 4×4 pixels, and even in this case the visual characteristics are clearly retained.

Next, using a 32×32 pixel image as an object, the result of a comparison of the image compression method of the present invention and the image compression method of the conventional technology is described.

<Compression Ratio Comparison>

In the method of the second aspect of the present invention, when image compression is performed using blocks of 4×4 pixels, the image is divided into 64 blocks. Since each block needs to have data of the inclined plane center value (1 byte), the gradient of the X direction (1 byte), the gradient of Y direction (1 byte), the amplitude index, and the correction map (24 bit=3 bytes), one block has 6 bytes of data quantity. Since the entire image has 64 blocks, 6 bytes×64 blocks=384 bytes. Since this image is 1 byte×32 pixels×32 pixels=1024 bytes, it would be compressed to 37.5% even at the worst compression ratio. Furthermore, in the data reduction process of the correction value information mentioned above, it is possible to achieve data having a further data quantity reduction of the block ratio, which was the object of the reduction process, of a maximum of 128 bytes (2 bytes×64 blocks) from 384 bytes. This reduction quantity in a natural image is most likely 30 to 90% of the maximum reduction quantity. The result of an investigation on the reduction quantity in the case where this reduction process was applied under the conditions of the comparison was 40 bytes.

On the other hand, the most standard compression method that uses DCT encoding is JPEG. When compression was performed for a similar image, using this JPEG method under conditions limited to monochrome (grayscale), and the quality priority ratio=60 (the ratio is 0 when the priority is placed on compression ratio and the ratio is 100, when the priority is placed on the image quality, and the quality priority ratio between 20 to 90 is practically recommended), the data became 380 bytes.

Moreover, a still higher compression ratio can be achieved according to the entropy coding of the second aspect of the present invention. However, with an image of this size, the compression ratio may be offset, since auxiliary information is needed for encoding, such as an occurrence ratio, or the improvement made by compression is limited as the size of the data is insufficient to produce an effect even if dynamic entropy coding is performed, it can be considered that the compression ratio as it stands is of a similar degree compared with an entropy coded JPEG.

<Calculation Time Comparison>

In the method of the present invention, as calculations that occur frequently, the average (addition) calculation of the outer edge part for determining the gradient, the inclined plane calculation (addition 3 times), the correction value (subtraction) calculation, the average of the correction values (addition) calculation, and the correction value encoding (bit operation), occur once respectively for each pixel. Accordingly, five addition and subtraction calculations, and two bit operation calculations are required for each pixel. Furthermore, in the case where the undulation is greater than the gradient and the gradient is ignored, re-calculation is required, and since the correction value calculation is repeated twice, six addition and subtraction calculations, and one bit operation calculation are performed in total. Therefore, addition and subtraction calculations are performed approximately six thousand times (32 pixels×32 pixels×6=approximately 6000), and bit operations are performed approximately one thousand times (32 pixels×32 pixels×1=approximately 1000), so that calculations are performed approximately seven thousand times in total.

In contrast, when using a DCT calculation, since DCT can be separated for each coordinate axis, considering only the one dimensional DCT calculation of the X direction from the two dimensional DCT results in the following number of calculations. Even the speeded-up DCT, which was proposed in "Practical fast 1-D DCT algorithm with 11 multiplications" by C. Loeffler, A. Ligtenberg, and G. S. Moschytz in International Conference on Acoustic, Speech, and Signal Process. pp. 988-991 (1989, May), requires eleven multiplications and twenty nine additions for each 8×1 pixel. In this case, 4×32×11 multiplication calculations and 4×32×29 addition calculations are performed for the entire image. Since this calculation also performs calculations the same number of times for one dimensional DCT of the Y direction, the calculation quantity of a two dimensional DCT would require 2.8 thousand multiplication calculations and 7.2 thousand addition calculations, even when it is speeded-up. Compared to the proposed method of the present invention, the method that uses DCT would require an additional 40% of calculation time even when the calculation times of multiplication and addition, and subtraction are taken to be equal, and in the case where the calculation time is doubled for multiplication (because the number of figures is double), an additional 80% of processing time is required.

In this way, it is possible to reduce processing time without deteriorating the image quality by introducing the method proposed by the present invention.

<Image Quality Comparison>

Regarding portions of an image, on which the human eye focuses in order to recognize an image, such as edges, line drawings and gradation portions, a compression method that uses the BTC method is compared with the compression method proposed in the present invention, the compression method by the present invention is proved to be superior in the image quality at the center and the gradation portions of the image, while uneven color occurs at edge portions if the image.

<Irreversible Encoding of Correction Value>

The correction value obtained as a difference from the inclined plane can be compressed using other encoding models such as DCT. However, in the present invention the correction values are expressed with two numeric values, namely: a value that is a group of signals representing a positive and negative undulation of each pixel, and a value representing the average amplitude quantity thereof. The description respectively describes the case where the undulation is greater than the gradient, and the case other than this case where the way of human recognition within the block changes.

(1) In the Case Where the Undulation is not Greater Than the Gradient

When a human recognizes a partial image within a small area such as a block, their attention is drawn to its most characteristic feature. When the undulation or edge is not greater than the inclination, the attention is drawn to the inclination, and the inclination is a trend and a simple characteristic of the entire block. In the state where a person's attention is drawn to the inclination of the pixel values in this way, even when there is a recognizable structure other than the inclination, the other structure is perceived as roughness of the inclination surface or a pattern overlapping the inclination variance. When the inclination is rough, the variance quantity of the rough color is recognized first. On the other hand, when it is seen as a pattern of color overlapping the background image where the pixel values are inclined, the shape of the pattern and its density are recognized. In the case where information is recognized by the inclination of the pixel values and the shape of the rough inclination, the roughness can be recognized by irregularity of negative and positive distributions of undulations including those of the surrounding blocks, and the shape of rough inclination can be obtained by rough approximation of patterns of negative and positive distribution. Furthermore, when an image seems to be a rough image, the degree of the roughness can be recognized from the variance between pixels. On the other hand, when recognizing a pattern of an image, the pattern is divided into bright and dark parts, and the density difference thereof is quantitatively recognized. In these cases, the detailed quantitative difference of the pattern, that is, detailed shape of density difference (density difference shown in FIG. 34) is not recognized. The value, which represents a quantitative difference of each pixel from the reference plane of the undulation as an amount of blurring associated with deviations in both the positive direction and the negative direction, represents the density of patterns and roughness, and this can be obtained by using the result of performing a statistical process such as averaging for the absolute value of the correction value. Therefore, even if further encoding by the present method is performed to further reduce the information quantity of the correction values, reproduction can be done by superposing roughness of the surface and a pattern. As a result, it becomes possible to reproduce an image that can be recognized as a similar image according to the characteristics of human visual sense.

(2) In the Case Where the Undulation is Greater than the Gradient

When a human recognizes a partial image within a small area such as a block, their attention is drawn to its most characteristic feature. In the case where a large undulation is included, there is a tendency for the attention to be attracted to the shape or edge of the undulation, and not to any other structure. The parts that are likely to be missed are subtle variances in luminance in bright parts and a subtle variance in dark parts (corresponding to part (A) in FIG. 35). Furthermore, around the edges, the luminance of the bright parts and the luminance of the dark parts are also likely to be ignored, because attention is attracted by the amount of luminance variance occurring at the edge even if the luminance of bright parts and the luminance of the dark parts vary slightly from original values. Therefore, by being able to express the pixel variance quantity for each of the pixels of both sides where an edge is taken as a border, and to which of a bright part or a dark part each pixel belongs, the encoding is matched for the characteristics of the human visual sense. Therefore, even if encoding by the present method is performed to further reduce the information quantity of the correction values, the shape and the variance of the edge is reproduced, and it is possible to reproduce an image that can be recognized as a similar image according to the characteristics of the human visual sense.

On the other hand, in the case where DCT is applied to these correction values to reduce that data quantity, there are not many problems when the undulation is not greater than the inclination. However, when the undulation is greater than the inclination, the shape of the correction quantity becomes dull, or there may be a case where, as a consequence of a reduction in high frequency on the edge part, a part having a large amount of local noise is not likely to be recognized as a similar image according to the characteristics of the human visual sense. Therefore, it cannot simply be said that it is sufficient to employ an encoding method having high efficiency. However, when the present method is used both in cases where the undulation is not greater than the inclination and where the undulation is greater than the inclination, it becomes possible, using the same method, to express characteristic parts that are necessary as correction values from the inclined plane, and that have characteristics matched to the human visual sense.

Accordingly, even in the case where compression is performed with a compression ratio at the same level as the DCT method, a large reduction in processing time can be achieved. Furthermore, image quality loss in the gradation part, which is likely to occur in the BTC method, can be prevented. Therefore, an image having quality that can be obtained by the combined methods of DCT and BTC can be obtained in a short period of time.

An image of respective pixels having only luminance values has been described in the above description. However for data to be processed by the method of the present invention: RGB may be processed as independent data, or RGB may be combined and batch-processed as a three dimensional vector value; or YUV may be processed as independent data, or YUV may be combined and batch-processed as a three dimensional vector value; or Y may be processed as independent data, or UV may be batch-processed as a two dimensional vector value; in order to achieve the same effect.

Moreover, the image compression process may be performed by recording a program for realizing the function of each of the processing portions in FIG. 19 onto a computer readable recording medium, and loading and executing the program recorded on this recording medium on a computer system. The "computer system" here includes an operating system and a set of hardware such as peripheral devices. Moreover, the "computer system" also includes a WWW system provided with a homepage providing environment (or display environment). Also, the "computer readable recording medium" means a portable medium such as a flexible disk, a magnetic optical disk, a ROM or a CD-ROM, or a storage unit such as a hard disk built into the computer system. Furthermore, the "computer readable recording medium" includes a medium for holding the program for a predetermined time, such as a volatile memory (RAM) in a computer system such as a server or a client when the program is transmitted through a network such as the Internet or a communication line such as a telephone line.

Moreover, the program may be transmitted from a computer system storing the program in a storage unit or the like to another computer system through a transmission medium or by transmitted waves in the transmission medium. Here, the "transmission medium" for transmitting the program means a medium having a functionality of transmitting information, including a network (communication network) such as the Internet or a communication line (communication line) such as a phone line. In addition, the program may be for realizing a part of the above functions. Furthermore, the program may be a so-called difference file (difference program) which can realize the above functions in combination with a program which has been already recorded in the computer system.

As described above, according to the second aspect of the present invention, by taking an inclined plane that approximates the outer edge as a reference, there will not be a sharp color change at the joint of the blocks even where blocks with strong inclines are in a series. Therefore an effect can be obtained such that block border noise does not occur and image quality can be improved.

Moreover, when compressing an edge, for drastic variances that cannot be expressed by an inclination, by switching the concavity and convexity of the extreme undulation that is peculiar to an edge for each pixel, correction values are approximated as a model that reproduces the original image in detail, and by adding the approximated value to the inclination information, image quality loss such as dullness of edge parts and noise occurrence along edge parts is eliminated, and an effect of image quality improvement can be achieved.

Furthermore, in the encoding process, since the present process can be performed by simple additions and subtractions, the calculation quantity is less than that of the DCT method in which an calculation has to be performed a number of times between the block area calculation of the power of 1.25 and to the power of 1.5 for each block (accurately, n×m×m+n×n×m times for FFT). Furthermore, an increase in calculation quantity is limited when the block area becomes large. Accordingly, since fast image processing becomes possible, and the block size variance can be handled flexibly, an optimal block size can be selected and encoding can be performed. As a result, an effect of improving the compression ratio can be achieved.

Hereinafter, a method, a device, and a program for compression encoding, and a method, a device, and a program for decoding according to a third aspect of the present invention are described in detail, with reference to FIG. 36 to FIG. 43.

[Method, Device, and Program for Compression Encoding]

Figure 36:
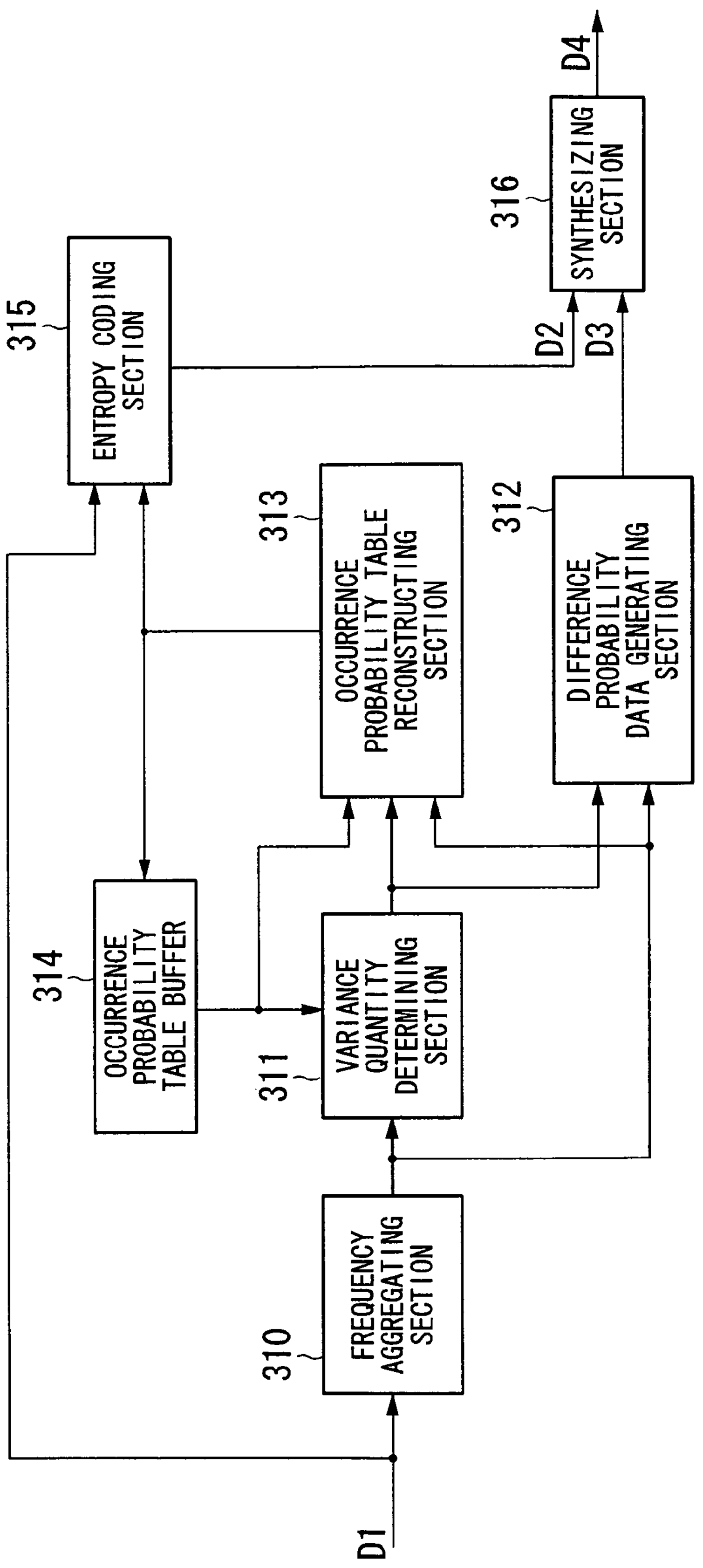
FIG. 36 is a block diagram showing the configuration of a compression encoding device according to one aspect of the present invention.

FIG. 36 is a block diagram showing the configuration of a compression encoding device according to one aspect of the present invention. As shown in FIG. 36, the compression encoding device of the present aspect comprises; a frequency aggregating portion 310, a variance quantity determining portion 311, a difference probability data generating portion 312, an occurrence probability table reconstructing portion 313, an occurrence probability table buffer 314, an entropy coding portion 315, and a synthesizing portion 316.

The frequency aggregating portion 310 collects compression target data D1 that is input continuously or intermittently, then aggregates an appearance frequency of respective data included in the collected compression target data D1, and finds an occurrence probability for each datum and creates an occurrence probability table. Furthermore, the frequency aggregating portion 310 also calculates the total number of data of input compression target data D1. The compression target data D1 here means monitoring data that is output from a monitoring device provided in a plant for example, and is data correlated in a time series. This monitoring data is for example, temperature data obtained by measuring the temperature, spectral data obtained by measuring sound, or image data captured by a monitoring camera. Moreover, in the description below, the compression target data D1 is taken to be image data.

Figure 37:
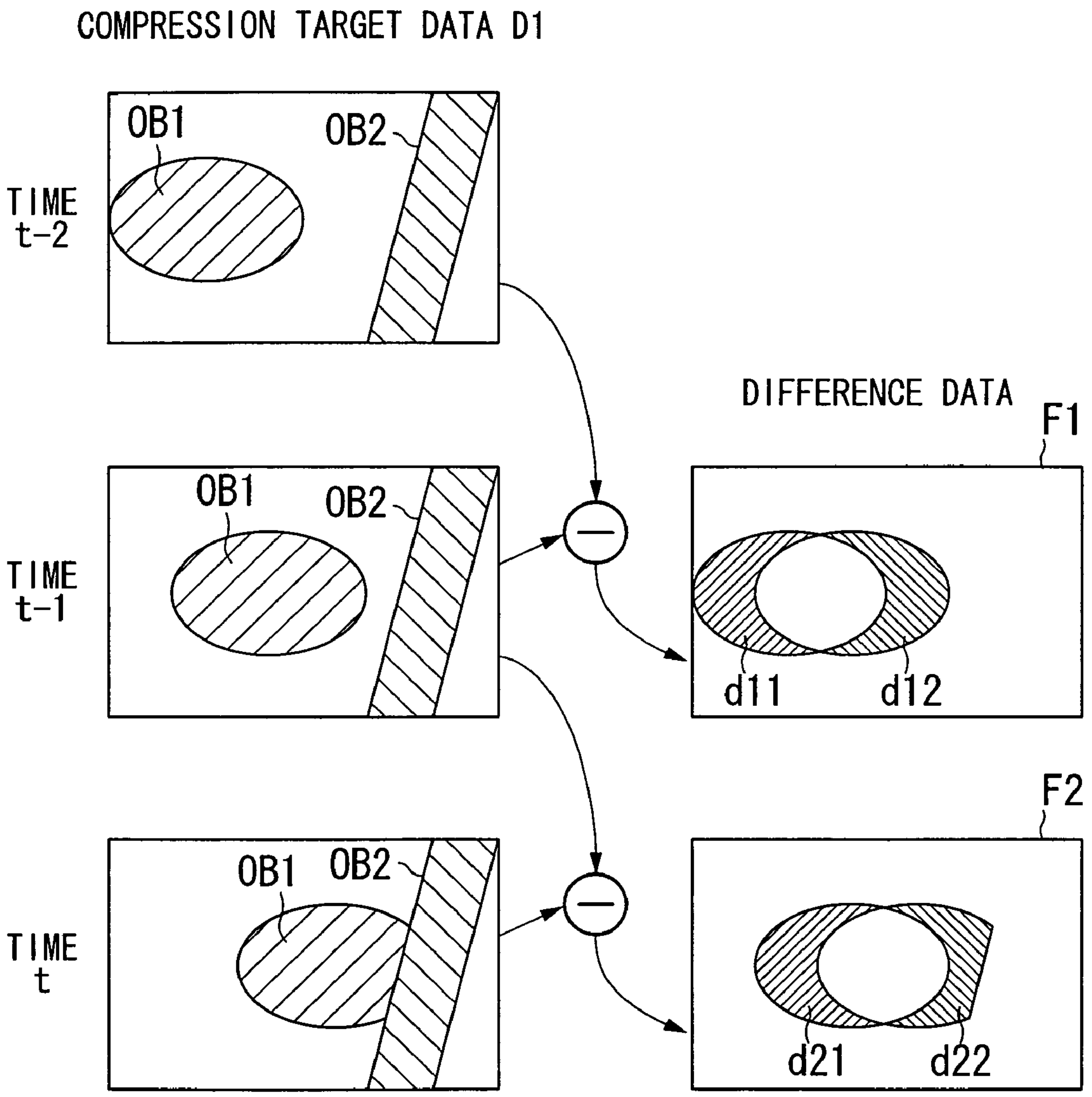
FIG. 37 is a diagram showing one example of compression target data D1 that is input to the compression encoding device according to one aspect of the present invention.

Here the compression target data D1 is described. FIG. 37 is a diagram showing one example of compression target data D1 that is input to the compression encoding device according to one aspect of the present invention. At this time it is assumed that a moving object OB1 and a stationary object OB2 are being captured by an image capturing device such as a camera provided in a monitoring apparatus (not shown in the diagram). Also, for sake of simplicity, it is assumed that the background does not change over time.

When the moving object OB1 and the stationary object OB2 like this are captured by the image capturing device, at each of time (t−2), time (t−1), and time t, compression target data D1 is obtained, in which only the position of the moving object OB1 is changed as shown in FIG. 37. Accordingly, the content of the compression target data D1 changes frequently, but the relativity between the compression target data D1 at a previous time and that at latter time is not entirely lost, and a certain degree of correlation still remains.

If the difference is found between compression target data D1 obtained in previous and latter times for compression target data D1 having time series correlation, difference data F1 and F2, can be obtained, as shown for example in FIG. 37. The difference data F1 is data that has been obtained as a difference between the compression target data D1 obtained at a time (t−2) and the compression target data D1 obtained at a time (t−1), and comprises: data d11 which represents a reduction in information showing the moving object OB1; and data d12 which represents an increase in information showing the moving object OB1. The difference data F2 is data that has been obtained as a difference between the compression target data D1 obtained at the time (t−1) and the compression target data D1 obtained at a time t, and comprises: data d21 which represents a reduction in information showing the moving object OB1; and data d22 which represents an increase in information showing the moving object OB1.

When the time sequential correlation of the compression target data D1 is high, the data quantities of the difference data F1 and F2 decrease. When the data quantities of the difference data F1 and F2 are small, content variance in the compression target data D1 that are obtained at previous and latter times becomes small, and a variance in the occurrence probability distribution of each data included in the compression target data D1 obtained at each time is small. Conversely, when the data quantities of the difference data F1 and F2 are large, the variance in content of the compression target data D1 that are obtained at previous and latter times becomes large, and the occurrence probability distribution of each datum included in the compression target data D1 obtained at each time varies greatly. The frequency aggregating portion 310 collects compression target data D1 that is obtained at each time, and aggregates an emergence frequency of each datum included in the collected compression target data D1, and finds an occurrence probability of each datum and creates an occurrence probability table.

Returning to FIG. 36, the variance quantity determining portion 311 determines the size of the variation quantity of the occurrence probability table, using the occurrence probability table created in the frequency aggregating portion 310, the occurrence probability table stored in the occurrence probability table buffer 314 and/or the total number of data of the input compression target data D1. In this determination, the variance quantity determining portion 311 uses a predetermined threshold value to determine, for each data included in the compression target data D1, whether or not the variation quantity of occurrence probability is above that threshold value. Here, the occurrence probability table created in the frequency aggregating portion 310 has been obtained from currently input compression target data, and the occurrence probability table stored in the occurrence probability table buffer 314 has been obtained from the compression target data D1 that was input the previous time or before the previous time. The threshold value used in the variation quantity determining portion 311 is set so as to reduce the total data quantity of the compression encoded data D4 that is finally output. A plurality of threshold value setting methods is provided and any one of these methods is used to set the threshold value. Threshold value setting methods are described in detail later.

The difference probability data generating portion 312 generates difference probability data D3 comprising the difference of the occurrence probability table in the case where the variance quantity determining portion 311 determines that the variation quantity of the occurrence probability table exceeds the predetermined threshold value. Here, the difference of the difference probability table means data that is a collection of occurrence probabilities for the data within the data included in the compression target data D1 having a widely different occurrence probability. Furthermore, for the data in which the variance quantity determining portion 311 determines that the variation quantity of the occurrence probability table is not above the predetermined threshold value, the difference probability data generating portion 312 generates the difference probability data D3 comprising information showing that the occurrence probability is equal to the previous occurrence probability.

For data for which the variance quantity determining portion 311 has determined that the variation quantity of the occurrence probability table is above the predetermined threshold value, the occurrence probability table reconstructing portion 313 updates the occurrence probability table stored in the occurrence probability table buffer 314 into the occurrence probability table generated in the frequency aggregating portion 310. The occurrence probability table buffer 14 temporarily stores the occurrence probability table used for encoding and compressing the compression target data D1, or the occurrence probability table that has been used for encoding the previous compression target data D1.

The entropy coding portion 315 encodes and compresses the compression target data D1 to generate compression encoded data D2, using the occurrence probability table temporarily stored in the occurrence probability table buffer 14. The synthesizing portion 316 synthesizes the compression encoded data D2 generated in the entropy coding portion 315 and the difference probability data D3, and generates compression encoded data D4, in which the difference probability data D3 is included in the compression encoded data D2.

The construction of the compression encoding device according to one aspect of the present invention has been described above. Next, the methods of threshold value setting used in the variance quantity determining portion 311 are described. As described above, the threshold value is set so as to reduce the total data quantity of the compression encoded data D4 output at the final stage. More specifically, in the case where the occurrence probability distribution of the compression target data D1 has varied, assuming that the variance quantity is small, the threshold value is set such that a reduced data quantity of the compression encoded data D4, which is obtained by not including the difference probability data D3 in the compression encoded data D4, is greater than an increased data quantity of the compression encoded data D4 due to the error that occurs when encoding is performed using the occurrence probability table before the variation. Here, the error occurs because the encoding is performed using the occurrence probability table before the variation, which has a different occurrence probability to the actual probability distribution of the compression target data D1. Hereinafter, a method for setting the threshold value is described in detail.

First, the following variables are defined.

$P_x^t$: Occurrence probability of data x, found from currently input compression target data D1

$P_x^{t-1}$: Occurrence probability of data x, found from previously input compression target data D1 m: Data quantity of the difference probability data D3 for a single datum (bit)

r: Data quantity of the difference probability data D3 consisting of information that shows that the occurrence probability for a single datum is equal to the previous occurrence probability (bit)

L: Total number of data of the compression target data D1 (pieces)

At this time, the case is considered where the occurrence probability $P_x$ of the data of data number x=X has changed by a factor of α, and the occurrence probability with error P^X=α$P_x$. For the sake of notation, a symbol "P" having a "^" symbol above it is written as "P^". In the case where the occurrence probability of a single datum has changed by a factor of α, then for the occurrence probability of the data excluding the data X, assuming that it varies so that the ratio between the occurrence probability each time is maintained, the occurrence probability of the data i excluding the data X (i≠X), is: $P^{\wedge}_i=P_i\cdot(1-P_x)/(1-\alpha P_x)$.

In the case where the occurrence probability of the data X does not change (in the case of occurrence probability $P_x$), the average data quantity (number of bits) E for a single datum when entropy compression is performed is expressed by the expression (1) below, and the total data quantity S is expressed by the expression (2) below.

$$E=\Sigma P_x \log_2(1/P_x) \tag{1}$$

$$S=L\Sigma P_x \log_2(1/P_x) \tag{2}$$

On the other hand, in the case where the occurrence probability of the data X changed into an occurrence probability with an error $P^{\wedge}_x=\alpha P_x$, an average data quantity (number of bits) E^ for a single datum when entropy compression is performed is expressed by the expression (3) below, and the total data quantity S^ is expressed by the expression (4) below. For the sake of notation, the symbol "E" having the "^" symbol above it is written as "E^" and the symbol "S" having the "^" symbol above it is written as "S^".

$$\hat{E}=\Sigma P_x \log_2(1/\hat{P}_x) \tag{3}$$

$$\hat{S}=L\Sigma P_x \log_2(1/\hat{P}_x) \tag{4}$$

Here, when the occurrence probability is expressed as $P_{xi}$, where the data has been determined not to be X and the data is i, the above expression (1) can be expressed as the expression (5). Here $P_i=(1-P_x)\,P_{xi}$.

$$\begin{aligned} E &= \sum P_x\log_2(1/P_x) \\ &= P_X\log_2(1/P_X) + \sum_{i\neq X} P_i\log_2(1/P_i) \\ &= P_X\log_2(1/P_X) + \sum_{i\neq X}(1-P_X)P_{Xi}\cdot\log_2(1/\{(1-P_X)P_{Xi}\}) \\ &= P_X\log_2(1/P_X) + (1-P_X)\left\{\begin{aligned}&\sum_{i\neq X}P_{Xi}\log_2(1/(1-P_X)) + \\ &\sum_{i\neq X}P_{Xi}\log_2(1/P_{Xi})\end{aligned}\right\} \\ &= P_X\log_2(1/P_X) + (1-P_X)\log_2(1/(1-P_X)) + \\ &\quad (1-P_X)\sum_{i\neq X}P_{Xi}\log_2(1/P_{Xi}) \end{aligned} \tag{5}$$

On the other hand, since the occurrence probability Pi of the data i excluding data X where the occurrence probability of the data X has changed by a factor of α can be found as: Pi=(1−αPx) PXi, from the probability when the data is not X (1−αPx) and from the occurrence probability PXi, the above expression (3) can be expressed as the expression (6) below.

$$\begin{aligned} \hat{E} &= \sum P_x\log_2(1/\hat{P}_x) \\ &= P_X\log_2(1/\alpha P_X) + \sum_{i\neq X} P_i\log_2(1/\hat{P}_i) \\ &= P_X\log_2(1/\alpha P_X) + \sum_{i\neq X}(1-P_X)P_{Xi}\cdot\log_2\left(\frac{1}{\{(1-\alpha P_X)P_{Xi}\}}\right) \\ &= P_X\log_2(1/\alpha P_X) + (1-P_X)\left\{\begin{aligned}&\sum_{i\neq X}P_{Xi}\log_2(1/(1-\alpha P_X)) + \\ &\sum_{i\neq X}P_{Xi}\log_2(1/P_{Xi})\end{aligned}\right\} \\ &= P_X\log_2(1/\alpha P_X) + (1-P_X)\log_2(1/(1-\alpha P_X)) + \\ &\quad (1-P_X)\sum_{i\neq X}P_{Xi}\log_2(1/P_{Xi}) \end{aligned} \tag{6}$$

From the above expressions (5) and (6), an increased compression encoding data quantity ΔE for a single encoding target datum in the case where the occurrence probability of the data X has changed by a factor of α can be expressed by the expression (7) below.

$$\begin{aligned} \Delta E &= \hat{E} - E \\ &= P_X\{\log_2(1/\alpha P_X) - \log_2(1/P_X)\} + \\ &\quad (1-P_X)\{\log_2(1/(1-\alpha P_X)) - \log_2(1/(1-P_X))\} \\ &= P_X\log_2(1/\alpha) + (1-P_X)\log_2((1-P_X)/(1-\alpha P_X)) \end{aligned} \tag{7}$$

When expressing the increased quantity ΔE, which is expressed by the above expression (7), as a function of the occurrence probability P and the variation quantity α, ΔE (P, α), the increase in the quantity of the total data quantity is LΔE (P, α).

In the case where information that shows that there are no significant changes in the variation quantity is not included in the compression encoding data for a single datum included in the compression target data D1, the difference probability data D3 can be reduced by as much as m−r bits. On the other hand, the increase in data quantity of the compression encoded data D2 in the case where encoding has been performed using an occurrence probability that has changed by a factor of α is LΔE (P, α) bits. Therefore, in the case where the data quantity reduction m−r is greater than the aforementioned data quantity increase LΔE (P, α), when the information that shows there are no significant changes in the variation quantity of the occurrence probability is not included in the compression encoding data, the total data quantity of the compression encoded data D4 that is finally obtained can be reduced.

In the present aspect, the conditional expression for realizing a reduction in the total data quantity of the compression encoded data D4 is expressed by the expression (8) below.

$$m-r \geqq L\cdot\{P_x \log_2(1/\alpha)+(1-P_x)\log_2((1-P_x)/(1-\alpha P_x))\} \tag{8}$$

Looking at the above expression (8), the reduction in data quantity m−r shown in the left part is a constant number, and the increase in data quantity LΔE (P, α) shown in the right part is a function expressed by the occurrence probability $P_X$ and the variation quantity α of the occurrence probability where the number of data L of the compression target data D1 and the occurrence probability of the data X do not change. Therefore, in order to satisfy the conditional expression (8) above, it is important that the occurrence probability variance quantity α be a value that is close to "1" (the variance quantity α is small). Accordingly, the threshold value set by the variance quantity determining portion 311 is determined based in principle on the occurrence probability variance quantity α. Hereinafter, a threshold value setting method is described.

[First Method for Setting a Threshold Value]

In a first setting method, a variance quantity allowance table that defines the upper limit value $T_{max}$ and the lower limit value $T_{min}$ for the variance quantity $\alpha(=P_x^{t-1}/P_x^t)$ of the occurrence probability table is pre-generated, and the values of this table are taken as the threshold values. Specifically, it determines whether or not the variance quantity of the occurrence probability $P_x^t$ of the data x included in the currently input compression target data D1 with respect to the occurrence probability $P_x^{t-1}$ of the data x included in the previously input compression target data D1 falls within the range of the inequality shown in the expression (9) below, where the data included in the compression target data D1 is x. In the case where the variance quantity of the occurrence probability $P_x^t$ of the data x falls in the range of the inequality shown in the expression (9) below, it is determined that the variance quantity of the occurrence probability $P_x^t$ of the data x is small and is not above the threshold value.

$$T_{min} < \frac{P_x^{t-1}}{P_x^t} < T_{max} \quad (9)$$

An upper limit value $T_{max}$ and the lower limit value $T_{min}$ in the expression (9) are set for each occurrence probability $P_x^t$ of the data x. The upper limit value $T_{max}$ decreases or remains the same as the occurrence probability $P_x^t$ of the data x increases, and is set to converge on a value "1" with respect to an occurrence probability $P_x^t$ having the largest value. The lower limit value $T_{min}$ increases or remains the same as the occurrence probability $P_x^t$ of the data x increases, and is set to converge on the value "1" with respect to the occurrence probability $P_x^t$ having the largest value.

The above method of using the variance quantity allowance table as a threshold value, is one which has been applied to a case where the total data quantity of the compression target data D1 does not change very much over time (specifically, on the assumption that the number of data L in the right part of the above expression (8) is substantially constant). For example in the case where the compression target data D1 is image data (motion image data), as defined by JPEG (ISO ITEC 10918-1) standard, the image data is often divided into 8×8 pixels blocks and separated into a DC (direct current) component and an AC (alternate current) component before being respectively subjected to entropy coding. In the case where the number of pixels of the compression target data D1 is 640×480 pixels, the maximum value of the number of data L is (640/8)×(480/8)=4800, and the value does not change significantly. Incidentally, in the first and second aspect of the present invention, since a block is 4×4 pixels, the number of data of each block is respectively (640/4)×(480/4)=19200.

In the case where the precision of quantizing the data occurrence probability information is 8 bit with respect to the compression target data D1, where the data quantity m is "8", and the data quantity r is "1" using a bit that expresses ON/OFF, a variance quantity allowance table shown in FIG. 38 is set for example. FIG. 38 is a diagram showing one example of a variance quantity allowance table used in a variance quantity determining portion 311. Making reference to FIG. 38, the upper limit value $T_{max}$ is set to decrease and converge on the value "1" as the occurrence probability P increases, and the lower limit value $T_{min}$ is set to increase and converge on the value "1".

[Second Method for Setting Threshold Value]

The first setting method is a method that is applicable in the case where the total data quantity of the compression target data D1 does not significantly change over time, in other words, in the case where the number of data L in the right part of the above expression (8) is assumed to be constant. However, a second setting method described here sets the threshold value taking also a change in the total data quantity of the compression target data D1 over time into consideration.

In the second setting method, the values of the occurrence probability $P_x^t$ of the data x and the variance quantity α $(P_x^{t-1}/P_x^t)$ of the occurrence probability are changed and substituted in the above expression (8), and a number of data condition table, which defines the condition $L_{th}$ of the number of data that satisfies the condition shown in the expression (8) when each value is substituted, is pre-created beforehand, and this becomes the threshold value. In the case where the number of the data x included in the compression target data D1 to be input is equal to or less than the number of data condition $L_{th}$ defined according to the occurrence probability $P_x^t$ and the variance quantity α, the variance quantity of the occurrence probability $P_x^t$ of the data x is determined to be small and not above the threshold value, and in the case where it is greater than the number of data condition $L_{th}$, the variance quantity of the occurrence probability $P_x^t$ of the data x is determined to be large and above the threshold value.

FIG. 39 is a diagram showing one example of the number of data condition table used in the variance quantity determining portion 311, and FIG. 39A is a diagram showing one example of the number of data condition table where the variance quantity α of the occurrence probability is greater than 1, and FIG. 39B is a diagram showing one example of the number of data condition table where the variance quantity α of the occurrence probability is smaller than 1. At this time, in FIG. 39A, paying attention to the data where the occurrence probability is "0.125 (⅛)" and the variance quantity α of the occurrence probability is "1.2", the number of data condition $L_{th}$ for this data is set to "1885". As a result, when the number of this data is less than or equal to "1885", it is determined not to be above the threshold value, and when the number of this data is greater than "1885", it is determined to be above the threshold value.

Moreover, paying attention to the data where the occurrence probability is "0.125 (⅛)" and the variance quantity α of the occurrence probability is "2", the number of data condition $L_{th}$ for this data is set to "101", and the value smaller than that in the above case is set. Accordingly, paying attention to data having the same occurrence probability P, the value of the number of the data condition $L_{th}$ is set such that it becomes smaller as the variance quantity α of the occurrence probability becomes greater (as the deviation quantity with respect to the value "1" of the variance quantity α becomes greater). This is to satisfy the condition shown in the expression (8) by making the value of the number of data condition $L_{th}$ small, since the error that occurs in encoding becomes larger and the value on the right part of the expression (8) becomes greater as the variance quantity α of the occurrence probability becomes greater. Furthermore, paying attention to the variance quantity α of the occurrence probability, a small value is set for the number of data condition $L_{th}$ when the occurrence probability is large, and conversely, when the occurrence probability is small, a large value is set.

[Third Method for Setting Threshold Value]

In both the first and second setting methods, the threshold values are defined by obtaining tables beforehand. However, in a third setting method, the left part of the conditional expression shown in the expression (8) becomes a threshold value. That is, the variance quantity determining portion 311 finds the value of the right part of the expression (8) using the occurrence probability $P_X$ in the case where the occurrence probability of the number of data L of the compression target data D1, and the data X do not change, and the variance quantity $\alpha$ of the occurrence probability, and determines whether or not this value is greater than or equal to the value in the expression (8). In the case where the value in the right part of the expression (8) is less than or equal to the value in the left part, and the conditional expression shown in the expression (8) is satisfied, it is determined that the variance quantity of the occurrence probability is small and the threshold value is not exceeded. In the case where the conditional expression is not satisfied, it is determined that the variance quantity of the occurrence probability is large and the threshold value is exceeded.

The methods for setting threshold values have been described above. The abovementioned first setting method is used in the case where the number of data L of the compression target data D1 does not significantly change over time, and the second setting method is used in the case where the number of data L of the compression target data D1 changes significantly over time. It is preferable to use these two methods according to the characteristics of the compression target data D1. Moreover, since the above third setting method carries out determination using numeral expressions, it is preferable that it be used when the variance quantity determining portion 311 has excess computing capacity.

Figure 40:
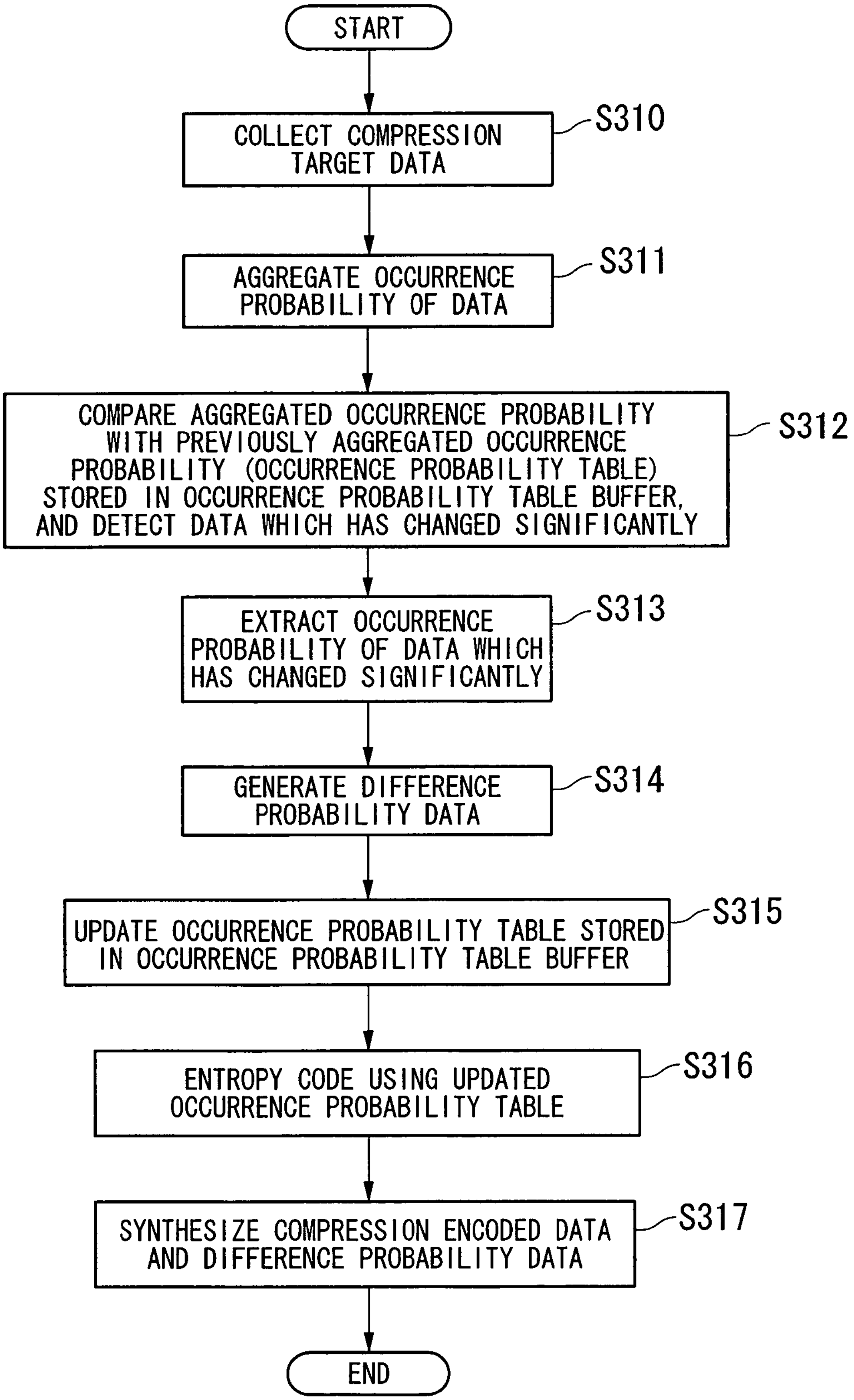
FIG. 40 is a flow chart showing a compression encoding method according to one aspect of the present invention.

Next, the operation of a compression encoding device according to one aspect of the present invention, specifically, a method for compression encoding according to one aspect of the present invention is described. FIG. 40 is a flow chart showing a compression encoding method according to one aspect of the present invention. Moreover, in the description below, for sake of simplicity, the variance quantity of the number of data L over time for the compression target data D1 is small, and a variance quantity allowance table is set for the variance quantity determining portion 311 using the above first setting method. Also, it is assumed that an occurrence probability table of a previously input compression target data D1 is stored in the occurrence probability table buffer 14 shown in FIG. 36.

When a new compression target data D1 is input, the frequency aggregating portion 310 collects the input compression target data D1 (step S310), and an emergence frequency of each datum included in the collected compression target data D1, and the occurrence probability for each datum is found and an occurrence probability table is generated (step S311). Next, the variance quantity determining portion 311 compares the occurrence probability table generated in the frequency aggregating portion 310 with the occurrence probability table temporarily stored in the occurrence probability table buffer 14, and determines the size of the variance quantity of the occurrence probability using the above variance quantity allowance table (see also FIG. 38), and detects data whose occurrence probability has changed significantly (step S312).

Figure 41A:
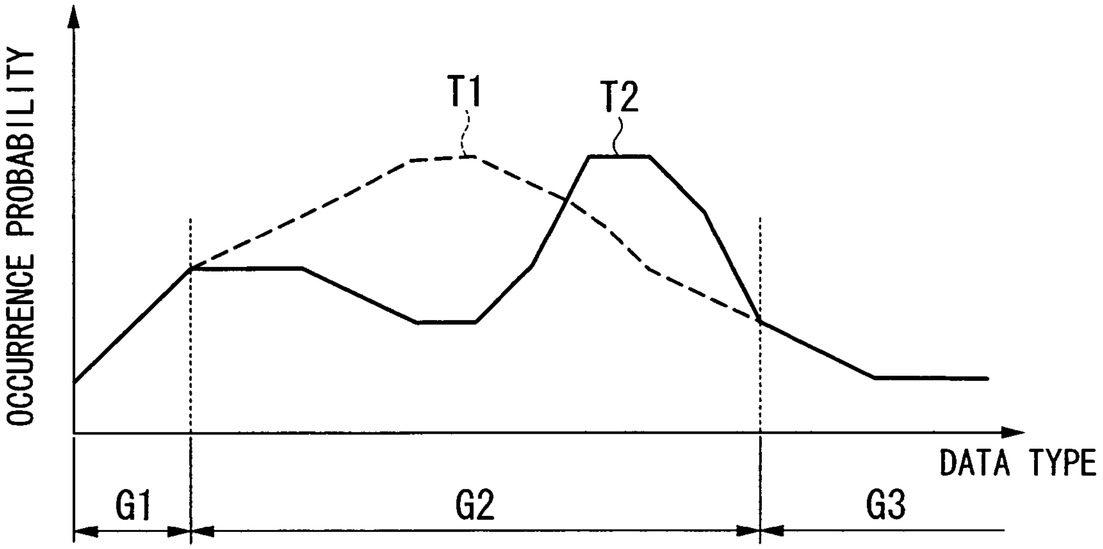
FIGS. 41A and 41B are diagrams showing an example of the appearance of changes of occurrence probability and the extracted appearance of occurrence probability of data in which the occurrence probability has significantly changed.
Figure 41B:
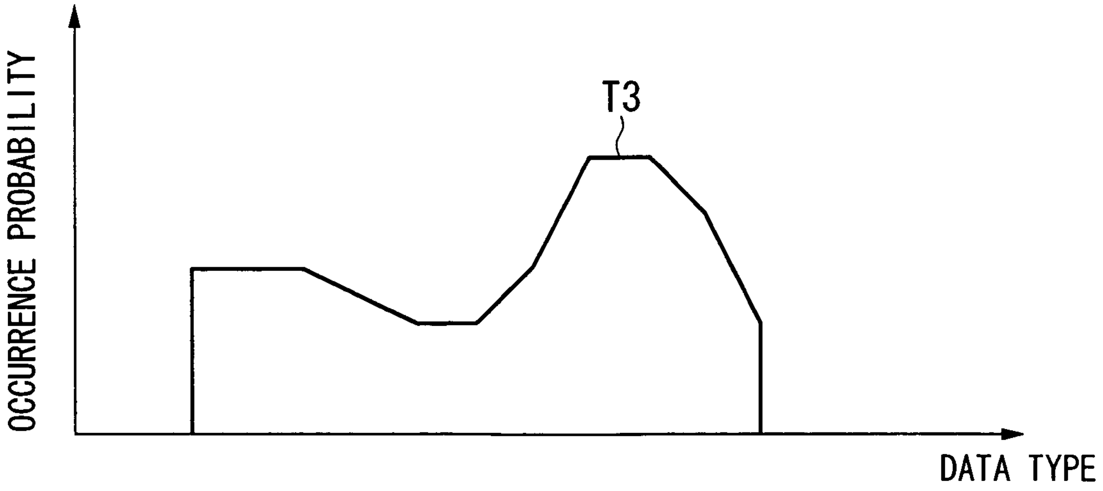

FIGS. 41A and 41B are diagrams showing an aspect of changes of generation probability, and an example of an aspect of extraction of generation probability of data for which the generation probability has changed significantly. In FIG. 41A, the curve with the reference symbol T1 denotes an occurrence probability distribution that is temporarily stored in the occurrence probability table buffer 14 (the occurrence probability distribution obtained from the previously input compression target data D1), and the curve with reference symbol T2 denotes an occurrence probability distribution obtained from the currently input compression target data. In the example shown in FIG. 41A, the occurrence probability variance quantities of data that belong to the ranges with the reference symbols G1 and G3 are small, and the occurrence probability variance quantity of data that belongs to the range with the reference symbol G2 is determined be large, and the data that belongs to the range with the reference symbol G2 is detected.

Next, based on the detection result obtained from the determination result of the variance quantity determining portion 311, the difference probability data generating portion 312 extracts the occurrence probability of the data for which the occurrence probability has significantly changed, from the occurrence probability table generated in the frequency aggregating portion 310 (step S313). FIG. 41B is a diagram showing one example of the occurrence probability extracted by the difference probability data generating portion 312. The example shown in FIG. 41B shows an aspect of when the occurrence probability of the data that belongs to the range with the reference symbol G2 in FIG. 41A (the occurrence probability obtained from the currently input compression target data D1) is extracted. The curve with the reference symbol T3 shows the extracted occurrence probability distribution.

Next, the difference probability data generating portion 312 generates the difference probability data D3 using the extracted difference probability data (step S314). At this time, in generating the difference probability data D3 the difference probability data generating portion 312 includes the occurrence probability extracted in step S313 for data that has a large occurrence probability variance quantity, and includes information indicating that the occurrence probability is equal to the previous occurrence probability for the data that has a small occurrence probability variance quantity. That is, in the example shown in FIG. 41A, the occurrence probability shown in FIG. 41B is included for the data that belongs to the range with the reference symbol G2, and information indicating that the occurrence probability is equal to the previous occurrence probability is included for the data that belong to the ranges with the reference symbols G1 and G2, when generating the difference probability data D3.

When the above processes are completed, the occurrence probability table reconstructing portion 313 updates the occurrence probability table stored in the occurrence probability table buffer 314, based on the detection result obtained from the determination result of the variance quantity determining portion 311 (step S315). For example, in the example shown in FIG. 41A, the occurrence probability related to the data within the range with the reference symbol G2 within the occurrence probability distribution with the reference symbol T1 is updated to the occurrence probability shown in FIG. 41B.

When the update of the occurrence probability table buffer 14 is complete, the entropy coding portion 315 performs entropy coding for the currently input compression target data D1 using the updated occurrence probability table and compresses it, and generates the compression encoded data D2 (step S316). When the encoding of the compression target data D1 is completed, the difference probability data D3 generated in the difference probability data generating portion 312 and the compression encoded data D2 generated in the entropy coding portion 315 are synthesized in the synthesizing portion 316, and compression encoded data D4, for which the difference probability data D3 is included in the compression encoded data D2, is generated (step S317).

The process when the compression target data D1 is input has been described above, and the same described process is performed every time the compression target data D1 is input consecutively or intermittently. Accordingly, in the present aspect, since the size of the occurrence probability variance quantity is determined, and only the occurrence probability of the data of a large occurrence probability variance quantity is included in the difference probability data D3, and the information indicating that the occurrence probability for the data of small occurrence probability variance is equal to the previous occurrence probability is included in the difference probability data D3, the total data quantity of the final compression encoded data D4 can be reduced. In particular, since the occurrence probabilities to be included in the difference probability data D3 become extremely few when the correlation in a time series of the compression target data D1 is high, a great reduction can be achieved in the total data quantity of the compression encoded data D4.

In the above aspect, the operation has been described for the case where the compression target data D1 has been input into the compression encoding device at least once in the past. However, for the compression target data D1 that was input to the compression encoding device first, the occurrence probabilities of all data included in the compression target data D1 are included in the difference probability data D3, and the compression encoded data D4, in which this difference probability data D3 is included in the compression encoded data D2, is generated.

Moreover, the above aspect has been described taking the example of a case where respective blocks shown in FIG. 36 are constructed with hardware and the compression encoding device is constructed by combining these blocks. However, the compression encoding device can be constructed with hardware as a computer system, and the functionality of each block that constitutes the compression encoding device can be realized with a program.

Furthermore, in the case where the compression encoding device is constructed as a computer system, it is not always necessary that all the programs for realizing the functionality of each block constituting the compression encoding device be built into the compression encoding device beforehand. For example, the system may be constructed such that a recording medium (not shown in the diagram) that stores the programs for realizing the function of the above each block is prepared, and a reading device that can read the program contents from this recording medium and can attach and release the recording medium (not shown in the diagram) is connected to the compression encoding device, which is constructed as a computer system, and the compression encoding device reads the necessary program contents for realizing the functions from the recording medium inserted into the reading device, and executes the read programs.

Moreover, the system may be constructed such that the compression encoding device reads the program contents from a recording medium inserted in a reading device, and installs the program contents internally. Furthermore, the system may be constructed such that the program contents necessary for realizing the functions are installed on the compression encoding device via a communication network using the Internet.

For the above recording medium, media that use various kinds of recording forms such as magnetic recording media (magnetic disk, magnetic tape, and the like), electrical recording media (PROM, battery-backed-up RAM, EEPROM, other semiconductor memory and the like), magnetic optical recording media (magnetic optical disk and the like), electromagnetic recording media (digital audio tape (DAT) and the like), or optical recording media (compact disk (CD), DVD (registered trademark)) and the like may be used. Accordingly, by constructing the system such that a recording medium storing the program contents for realizing the functions can be used and installed, program content modifications or version up-grades for performance improvement can be easily carried out.

[Method, Device, and Program for Encoding]

Figure 42:
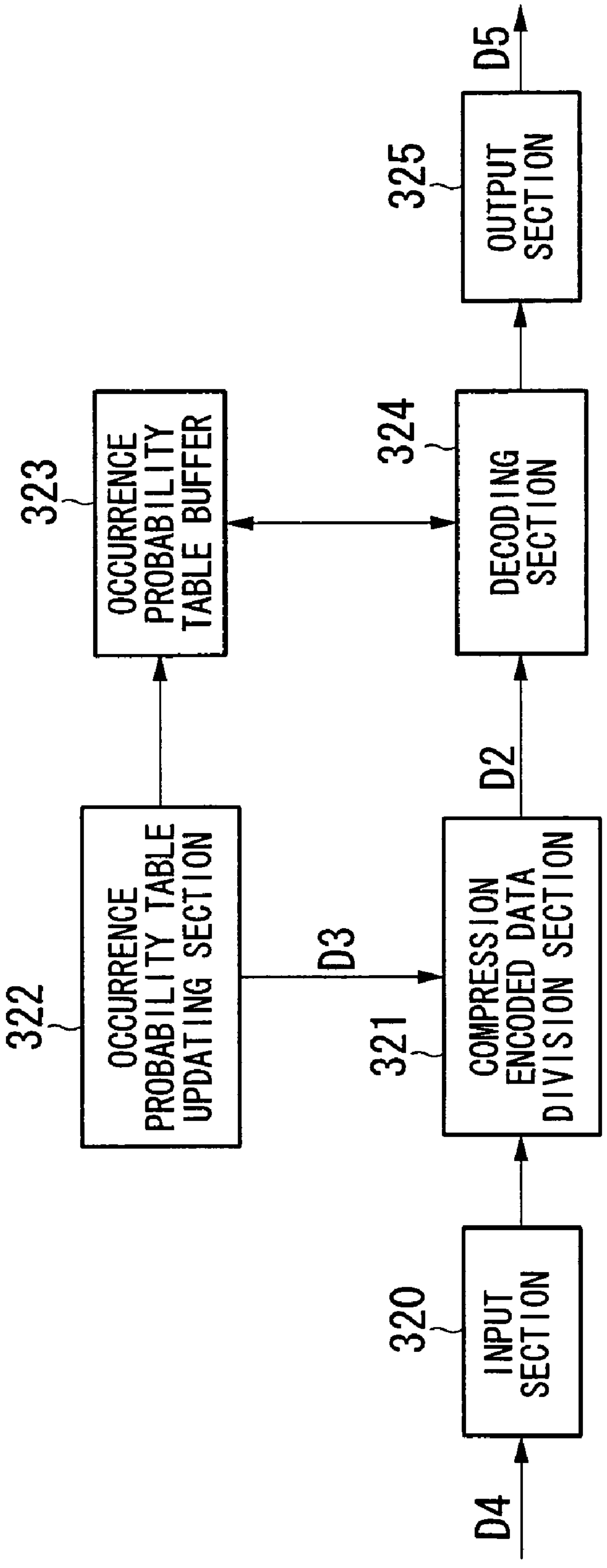
FIG. 42 is a block diagram showing the configuration of a decoding device according to one aspect of the present invention.

FIG. 42 is a block diagram showing the configuration of a decoding device according to one aspect of the present invention. As shown in FIG. 42, the decoding device of the present invention comprises an input portion 320, a compression encoded data division portion 321, an occurrence probability table updating portion 322, an occurrence probability table buffer 323, a decoding portion 324, and an output portion 325.

The input portion 320 inputs the compression encoded data D4 that has been compressed by encoding using the above device, method, or program for compression encoding. This input portion 320, for example, has a function corresponding to a reading portion that reads the recorded compression encoded data D4 in the case where the compression encoded data D4 is recorded on a recording device such as a hard disk drive, and has a function corresponding to a receiving portion that receives the transmitted compression encoded data D4 in the case where the compression encoded data D4 is transmitted.

The compression encoded data division portion 321 divides the compression encoded data D4 inputted from the input portion 320 into the compression encoded data D2 and difference probability data D3 included in the compression encoded data D4, and extracts the difference probability data D3. The occurrence probability table updating portion 322 updates the content of the occurrence probability table buffer 323, using the difference probability data D3 that has been extracted in the compression encoded data division portion 321. The occurrence probability table buffer 323 temporarily stores the occurrence probability table buffer that is used when decoding the compression encoded data D2 that has been divided in the compression encoded data division portion 321. The decoding portion 324 decodes the compression encoded data D2 that has been divided in the compression encoded data division portion 321 using the occurrence probability table temporarily stored in the occurrence probability table buffer 323. The output portion 325 outputs decoded data D5 that has been decoded in the decoding portion 324.

Figure 43:
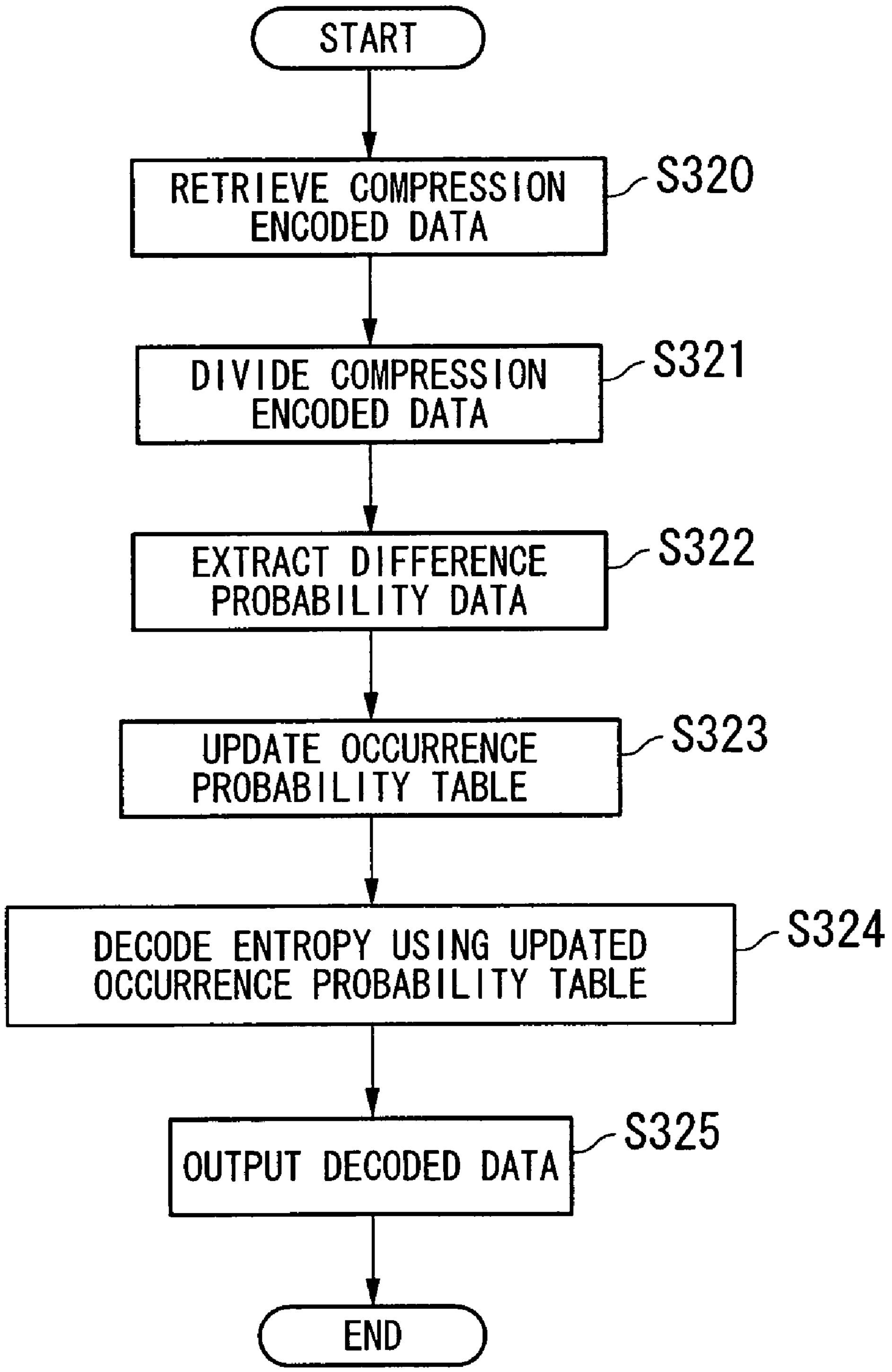
FIG. 43 is a flow chart showing a decoding method according to one aspect of the present invention.

Next, the operation of the decoding device according to the third aspect of the present invention, specifically, the decoding method according to one aspect of the present invention, is described. FIG. 43 is a flow chart showing a decoding method according to one aspect of the present invention. Moreover, in the description below, for sake of simplicity, an occurrence probability table that has been extracted from previously input compression encoded data D4 is assumed to be stored in the occurrence table buffer 23 shown in FIG. 42.

When new compression encoded data D4 is input, the input portion 320 retrieves it (step S320). The new compression encoded data D4 retrieved in the input portion 320 is divided into compression encoded data D2 and difference probability data D3 in the compression encoded data division portion 21 (step S21), and the difference probability data D3 is extracted (step S322). The extracted difference probability data D3 is outputted to the occurrence probability table updating portion 322, and is used for updating the occurrence probability table buffer 23 (step S323).

In the difference probability data D3, only the occurrence probability of the data for which the occurrence probability variance quantity in compression encoding is large is included, and for the data of a small occurrence probability variance quantity, information indicating that the occurrence probability is equal to the previous occurrence probability is included. The occurrence probability table updating portion 322 updates only the data in the occurrence probability table recorded in the occurrence probability table buffer 23 for which the difference probability data D3 include an occurrence probability, and does not update the occurrence probability for data that include information indicating that the occurrence probability is equal to the previous occurrence probability.

When the occurrence probability table buffer 323 has been updated, the decoding portion 24 decodes the compression encoded data D2 that has been divided in the compression encoded data division portion 21 using the updated occurrence probability table (step S324). The decoded data that has been decoded in the decoding portion 24 is output as decoded data D5 from the output portion 25 (step S325).

The process when the compression encoded data D4 is input has been described above, and a process the same as that described above is performed every time the compression encoded data D4 is input consecutively or intermittently. Accordingly, in the present aspect, the compression encoded data D4 is divided into compression encoded data D2 and difference probability data D3 included therein, to extract the difference probability data D3, and the content of the occurrence probability table buffer 23 is updated using the extracted difference probability data D3, and decoding is performed using the updated occurrence probability table. As a result, since the compression encoded data D2 is decoded using the same occurrence probability table that was used when encoding the compression encoded data D2, a correct decoding result can be obtained.

In the above aspect, the operation in the case where the compression encoded data D4 has been input to the decoding device at least once in the past is described. For the compression encoded data D4 that was input to the decoding device first, since the difference probability data D3 that is included in the compression target data D4 includes the occurrence probabilities of all data that are included in the compression target data D1, when all the contents of this difference probability data D3 is stored in the occurrence probability table buffer 23 and decoding is performed, decoding can be performed without a problem.

Moreover, the above aspect has been described taking the example of a case where respective blocks shown in FIG. 42 are constructed with hardware and the decoding device is constructed by combining these blocks. However, the decoding device can be constructed with hardware such as a computer system, and the functionality of each block that constitutes the decoding device can be realized with a program.

Furthermore, in the case where the decoding device is constructed as a computer system, as with the compression encoding device mentioned above, it is not always necessary that all the programs for realizing the functionality of each block constituting the decoding device be built into the decoding device beforehand. For example, the system may be constructed such that a recording medium (not shown in the diagram) that stores the programs for realizing the function of the above each block is prepared, and a reading device that can read the program contents from this recording medium and can attach and release the recording medium (not shown in the diagram) is connected to the decoding device, which is constructed as a computer system, and the decoding device reads the necessary program contents for realizing the functions from the recording medium inserted into the reading device, and executes the read programs.

Moreover, the system may be constructed such that the decoding device reads the program contents from a recording medium inserted in a reading device, and installs the program contents internally. Furthermore, the system may be constructed such that the program contents necessary for realizing the functions are installed on the decoding device via a communication network using the Internet. Furthermore, as a recording medium, the same media as mentioned above can be used. Accordingly, by constructing the system such that a recording medium storing the program contents for realizing the functions can be used and installed, in the decoding device too, program content modifications or version up-grades for performance improvement can be easily carried out.

A method, device, and program for compression encoding and a method, device, and program for decoding according to one aspect of the present invention are described above. However, the present invention is not limited to the above aspect, and modifications can be freely made thereto within the scope of the present invention.

According to the third aspect of the present invention, an effect of a reduction in the total data quantity of the final compression encoded data can be achieved because the size of the occurrence probability variance quantity for each data included in the compression target data is determined, and the difference probability data that includes a large variance quantity data is generated, and only this difference probability data is included in the compression encoded data. In particular, since the occurrence probabilities to be included in the difference probability data become extremely few when correlation in a time series of the compression target data is high, there is an effect such that a great reduction in the total data quantity of the compression encoded data can be achieved.

Furthermore, according to the present invention, since the difference probability data that is included in the compressed compression encoded data is divided and extracted to update the difference probability table, and the divided compression encoded data is decoded using the updated difference probability table, an effect can be achieved such that decoding is performed using the same occurrence probability table that was used in the compression encoding, and a correct decoding result can be obtained.

INDUSTRIAL APPLICABILITY

The present invention provides an image compression device, method, and program that are capable of improving image quality without lengthening the computation process, and furthermore provides a compression encoding method, device, and program that can achieve a reduction in the total data quantity, even in the case where occurrence probability is included, and moreover provides a decoding method, device, and program for decoding the compression encoded data that has been encoded. Therefore it can be used for image compression, encoding of compressed data, and decoding of the encoded data. In particular, in the compression of dynamic images, by using a compression encoding method, device, and program, or a compression encoding method, device, and program, it is possible to suppress degradation of image quality and reduce data quantity.

The invention claimed is:

1. An image compression device comprising:

block division portion that divides an entire image into blocks of n×m pixels (where n and m are real numbers equal to or greater than 4);

first inclined plane calculation portion that finds parameters that specify a first inclined plane that approximates said block, from said block pixel values;

error amount calculation portion that calculates n×m pieces of error amounts by calculating the difference between said first inclined plane and each pixel value in said block;

second inclined plane calculation portion that in the case where a pixel having said error amount above a predetermined threshold value is present, finds parameters that specify a second inclined plane only from the pixel values having the error amount above the predetermined threshold value; and encoding portion that performs reversible encoding for the parameters that specify said first and second inclined planes.

2. The image compression device according to claim 1, wherein said first inclined plane calculation portion finds the parameters which specify the inclined plane from only the pixel value of an outer edge part of said block.

3. An image compression method that irreversibly compresses image data, said method comprising:

a block division step for dividing an entire image into blocks of n×m pixels (where n and m are real numbers equal to or greater than 4);

a first inclined plane calculation step for obtaining parameters that specify a first inclined plane that approximates said block, from said block pixel values;

an error amount calculation step for calculating n×m pieces of error amounts by calculating the difference between said first inclined plane and each pixel value in said block;

a second inclined plane calculation step for, in the case where a pixel having said error amount above a predetermined threshold value is present, obtaining parameters that specify a second inclined plane only from the pixel values having the error amount above the predetermined threshold value; and an encoding step for performing reversible encoding for the parameters that specify said first and second inclined planes.

4. The image compression method according to claim 3, wherein said first inclined plane calculation step obtains the parameters which specify the inclined plane from only the pixel value of an outer edge part of said block.

5. A computer-readable medium storing an image compression program for irreversibly compressing image data, said program executing on a computer:

a block division process for dividing an entire image into blocks of n×m pixels (where n and m are real numbers equal to or greater than 4);

a first inclined plane calculation process for obtaining parameters that specify a first inclined plane that approximates said block, from said block pixel values;

an error amount calculation process for calculating n×m pieces of error amounts by calculating the difference between said first inclined plane and each pixel value in said block;

a second inclined plane calculation process for, in the case where a pixel having said error amount above a predetermined threshold value is present, obtaining parameters that specify a second inclined plane only from the pixel values having the error amount above the predetermined threshold value; and an encoding process for performing reversible encoding for the parameters that specify said first and second inclined planes.

6. The computer-readable medium storing an image compression program according to claim 5, wherein said first inclined plane calculation process finds the parameters which specify the inclined plane from only the pixel value of an outer edge part of said block.

7. An image compression device comprising:

block division portion that divides an entire image into blocks of n×m pixels (where n and m are real numbers equal to or greater than 4);

outer edge incline calculation portion that finds the parameters that specify an inclined plane that approximates an outer edge part of said block from the pixel values of only said outer edge part;

correction value calculation portion that calculates n×m correction values by calculating the difference between said inclined plane and each pixel value in said block; and encoding portion that performs irreversible encoding for said correction value, and performs reversible encoding for said encoded correction values and for the parameters that specify said inclined plane.

8. The image compression device according to claim 7, wherein said encoding portion comprises: encoding calculation portion that expresses the polarity of each of said n×m correction values with 1 bit; and statistical calculation portion that finds value which indicates a variance scale of the correction values of a block by statistically processing the correction values in said block.

9. An image compression method that irreversibly compresses image data, said method comprising:

a block division step for dividing an entire image into blocks of n×m pixels (where n and m are real numbers equal to or greater than 4);

an outer edge inclined plane calculation step for finding parameters that specify an inclined plane that approximates an outer edge part of said block from the pixel values of only said outer edge part;

a correction value calculation step for calculating n×m correction values by calculating the difference between said inclined plane and each pixel value in said block; and an encoding step for performing irreversible encoding for said correction value, and performing reversible encoding for said encoded correction values and for the parameters that specify said inclined plane.

10. The image compression method according to claim 9, wherein said encoding step, expresses the polarity of each of said n×m correction values in 1 bit, and statistically processes the absolute value of each correction value, and performs irreversible encoding by finding a statistical index that indicates the correction scale and making this an amplitude value of all correction values.

11. A computer-readable medium storing an image compression program for irreversibly compressing image data, said program executing on a computer:

a block division process for dividing an entire image into blocks of n×m pixels (where n and m are real numbers equal to or greater than 4);

an outer edge inclined plane calculation process for finding parameters that specify an inclined plane that approximates an outer edge part of said block from the pixel values of only said outer edge part;

a correction value calculation process for calculating n×m correction values by calculating the difference between said inclined plane and each pixel value in said block; and an encoding process for performing irreversible encoding for said correction value, and performing reversible encoding for said encoded correction values and for the parameters that specify said inclined plane.

12. The computer-readable medium storing an image compression program according to claim 11, wherein said encoding process, expresses the polarity of each of said n×m correction values in 1 bit, and statistically processes the absolute value of each correction value, and performs irreversible encoding by finding a statistical index that indicates the correction scale and making this an amplitude value of all correction values.

13. A compression encoding method using entropy coding techniques that generates compression encoded data compressed by encoding compression target data correlated in a time series, the method comprising:

a determination step that determines a size of the variance quantity of the occurrence probability of each of the data included in said compression target data obtained over time;

a difference probability data generating step that generates difference probability data including the occurrence probability of the data which has been determined to have a large variance quantity of said occurrence probability; and a synthesizing step that includes said difference probability data in said compression encoded data.

14. The compression encoding method according to claim 13, wherein said determination step assumes that the change in the occurrence probability of said data is small, and carries out said determination using a threshold value which is set so that a reduction in data quantity of said compression encoded data due to the occurrence probability of said data not being included as said difference probability data in said compression encoded data, is greater than an increase in data quantity of said compression encoded data due to the error occurring when encoding said compression target data using the occurrence probability prior to variation.

15. The compression encoding method according to claim 14, wherein said threshold value is set as a variance quantity allowance table that defines an upper limit value and a lower limit value of an allowable occurrence probability variance quantity with respect to each of said data, and said determination step determines the occurrence probability variance quantity to be large, in the case where the occurrence probability variance quantity of said data is large and above an upper limit value defined in said variance quantity allowance table, or small and below a lower limit value.

16. The compression encoding method according to claim 14, wherein said threshold value is set in a number of data condition table which defines the number of data condition indicating the maximum number of said data for each occurrence probability of said data and each variance quantity of said occurrence probability, and said determination step determines the variance quantity of said occurrence probability to be large in the case where the number of data included in said compression target data is large and above the number of data condition which is defined in said number of data condition table.

17. The compression encoding method according to claim 14, wherein said threshold value is set at said reduced data quantity, and said determination step determines the variance quantity of said occurrence probability to be large in the case where said increased data quantity, which is found from the number of data, the occurrence probability, of said data, is large and above said reduced data quantity.

18. The compression encoding method according to claim 13, wherein said difference probability data generating step includes in said difference probability data, information that indicates that the occurrence probability is equal to the previous occurrence probability, for the data whose variance quantity of said occurrence probability is determined be small.

19. A compression encoding device that comprises an encoding portion that generates compression encoded data, the compression encoded data being generated by a compression encoding method using entropy coding techniques, the compression encoded data being compressed by encoding compression target data correlated in a time series, the compression encoding device comprising:

a variance quantity determining portion that determines a size of the variance quantity of the occurrence probability of each of the data included in said compression target data obtained over time;

a difference probability data generating portion that generates difference probability data including the occurrence probability of the data which has been determined to have a large variance quantity of said occurrence probability; and a synthesizing portion that includes the difference probability data generated in said difference probability data generating portion in said compression encoded data generated in said encoding portion.

20. The compression encoding device according to claim 19, wherein said variance quantity determining portion assumes that the change in the occurrence probability of said data is small, and carries out said determination using a threshold value which is set so that a reduction in data quantity of said compression encoded data due to the occurrence probability of said data not being included as said difference probability data in said compression encoded data, is greater than an increase in data quantity of said compression encoded data due to the error occurring when encoding said compression target data using the occurrence probability prior to variation.

21. The compression encoding device according to claim 19, wherein said difference probability data generating portion includes in said difference probability data, information that indicates that the occurrence probability is equal to the previous occurrence probability, for the data whose variance quantity of said occurrence probability is determined to be small.

22. A computer-readable medium storing a compression encoding program that generates compression encoded data by a compression encoding method using entropy coding techniques, the compression encoded data being compressed by encoding compression target data correlated in a time series, the compression encoding program comprising:

a determination step that determines a size of the variance quantity of the occurrence probability of each of the data included in said compression target data obtained over time;

a difference probability data generating step that generates difference probability data including the occurrence probability of the data which has been determined to have a large variance quantity of said occurrence probability; and a synthesizing step that includes said difference probability data in said compression encoded data.

23. The computer-readable medium storing a compression encoding program according to claim 22, wherein said determination step assumes that the change in the occurrence probability of said data is small, and carries out said determination using a threshold value which is set so that a reduction in data quantity of said compression encoded data due to the occurrence probability of said data not being included as said difference probability data in said compression encoded data, is greater than an increase in data quantity of said compression encoded data due to the error occurring when encoding said compression target data using the occurrence probability prior to variation.

24. The computer-readable medium storing a compression encoding program according to claim 23, wherein said threshold value is set as a variance quantity allowance table that defines an upper limit value and a lower limit value of an allowable occurrence probability variance quantity with respect to each of said data, and said determination step determines the occurrence probability variance quantity to be large, in the case where the occurrence probability variance quantity of said data is large and above an upper limit value defined in said variance quantity allowance table, or small and below a lower limit value.

25. The computer-readable medium storing a compression encoding program according to claim 23, wherein said threshold value is set in a number of data condition table which defines the number of data condition indicating the maximum number of said data for each occurrence probability of said data and each variance quantity of said occurrence probability, and said determination step determines the variance quantity of said occurrence probability to be large in the case where the number of data included in said compression target data is large and above the number of data condition which is defined in said number of data condition table.

26. The computer-readable medium storing a compression encoding program according to claim 23, wherein said threshold value is set at said reduced data quantity, and said determination step determines the variance quantity of said occurrence probability to be large in the case where said increased data quantity, which is found from the number of data, the occurrence probability, and the variance quantity of the occurrence probability of said data, is large and above said reduced data quantity.

27. The computer-readable medium storing a compression encoding program according to claim 22, wherein said difference probability data generating step includes in said difference probability data, information that indicates that the occurrence probability is equal to the previous occurrence probability, for the data whose variance quantity of said occurrence probability is determined to be small.

28. A decoding method comprising:

a division and extraction step that divides and extracts difference probability data included in said compression encoded data generated by the compression encoding method using entropy coding techniques according to claim 13;

an updating step that updates an occurrence probability table that indicates occurrence probability of each data included in said compression target data, using said extracted difference probability data; and a decoding step that performs decoding of said compression encoded data, using the updated occurrence probability table.

29. A decoding method comprising:

a division and extraction step that divides and extracts difference probability data included in the compression encoded data generated by the encoding portion included in the compression encoding device according to claim 19;

an updating step that updates an occurrence probability table that indicates occurrence probability of each data included in said compression target data, using said extracted difference probability data; and a decoding step that performs decoding of said compression encoded data, using the updated occurrence probability table.

30. A decoding method comprising:

a division and extraction step that divides and extracts difference probability data included in the compression encoded data generated by the compression encoding program according to claim 22;

an updating step that updates an occurrence probability table that indicates occurrence probability of each data included in said compression target data, using said extracted difference probability data; and a decoding step that performs decoding of said compression encoded data, using the updated occurrence probability table.

31. A decoding device comprising:

a division and extraction portion that divides and extracts difference probability data included in said compression encoded data generated by the compression encoding method according to claim 13;

a memory portion that stores an occurrence probability table that indicates occurrence probability each data included in said compression target data;

an updating portion that updates the occurrence probability table stored in said memory portion, using said difference probability data extracted by said extraction portion; and a decoding portion that performs decoding of said divided compression encoded data, using the updated occurrence probability table.

32. A decoding device comprising:

a division and extraction portion that divides and extracts difference probability data included in said compression encoded data generated by the encoding portion included in the compression encoding device according to claim 19;

a memory portion that stores an occurrence probability table that indicates occurrence probability of each data included in said compression target data;

an updating portion that updates the occurrence probability table stored in said memory portion, using said difference probability data extracted by said extraction portion; and a decoding portion that performs decoding of said divided compression encoded data, using the updated occurrence probability table.

33. A decoding device comprising:

a division and extraction portion that divides and extracts difference probability data included in the compression encoded data generated by the compression encoding program according to claim 22;

a memory portion that stores an occurrence probability table that indicates occurrence probability of each data included in said compression target data;

an updating portion that updates the occurrence probability table stored in said memory portion, using said difference probability data extracted by said extraction portion; and a decoding portion that performs decoding of said divided compression encoded data, using the updated occurrence probability table.

34. A computer-readable medium storing a decoding program comprising:

a division and extraction step that divides and extracts difference probability data included in said compression encoded data generated by the compression encoding method according to claim 13;

an updating step that updates an occurrence probability table that indicates occurrence probability of each data included in said compression target data, using said extracted difference probability data; and a decoding step that performs decoding of said compression encoded data, using the updated occurrence probability table.

35. A computer-readable medium storing a decoding program comprising:

a division and extraction step that divides and extracts difference probability data included in said compression encoded data generated by the encoding portion included in the compression encoding device according to claim 19;

an updating step that updates an occurrence probability table that indicates occurrence probability of each data included in said compression target data, using said extracted difference probability data; and a decoding step that performs decoding of said compression encoded data, using the updated occurrence probability table.

36. A computer-readable medium storing a decoding program comprising:

a division and extraction step that divides and extracts difference probability data included in said compression encoded data generated by the compression encoding program according to claim 22;

an updating step that updates an occurrence probability table that indicates occurrence probability of each data included in said compression target data, using said extracted difference probability data; and a decoding step that performs decoding of said compression encoded data, using the updated occurrence probability table.

* * * * *